US012330618B2

(12) United States Patent
Yuan et al.

(10) Patent No.: US 12,330,618 B2
(45) Date of Patent: Jun. 17, 2025

(54) FAILSAFE BRAKING SYSTEMS WITH INDEPENDENT BRAKING ACTUATIONS FOR AUTONOMOUS OR ASSISTED DRIVING VEHICLES

(71) Applicant: Apollo Autonomous Driving USA LLC, Sunnyvale, CA (US)

(72) Inventors: Baoping Yuan, Sunnyvale, CA (US); Yaoming Shen, Sunnyvale, CA (US)

(73) Assignee: Apollo Autonomous Driving USA LLC, Sunnyvale, CA (US)

( * ) Notice: Subject to any disclaimer, the term of this patent is extended or adjusted under 35 U.S.C. 154(b) by 406 days.

(21) Appl. No.: 18/056,606

(22) Filed: Nov. 17, 2022

(65) Prior Publication Data

US 2024/0166182 A1 May 23, 2024

(51) Int. Cl.
*B60T 8/88* (2006.01)
*B60T 13/66* (2006.01)

(52) U.S. Cl.
CPC ............ *B60T 8/885* (2013.01); *B60T 13/662* (2013.01); *B60T 2270/413* (2013.01)

(58) Field of Classification Search
CPC .. B60T 8/885; B60T 13/662; B60T 2270/413; B60T 7/042; B60T 13/686; B60T 17/22
See application file for complete search history.

(56) References Cited

U.S. PATENT DOCUMENTS

| | | | |
|---|---|---|---|
| 11,142,178 B2 | 10/2021 | Ganzel et al. | |
| 2011/0248560 A1 | 10/2011 | Vollert et al. | |
| 2014/0060981 A1* | 3/2014 | Back | B60T 13/662 188/72.1 |
| 2016/0114779 A1* | 4/2016 | Binder | B60T 8/171 701/76 |
| 2020/0198607 A1 | 6/2020 | Weitze | |
| 2020/0216052 A1 | 7/2020 | Campau | |
| 2021/0155215 A1 | 5/2021 | Ganzel | |
| 2021/0394721 A1 | 12/2021 | Hecker et al. | |
| 2023/0148031 A1* | 5/2023 | Lim | B60T 13/146 303/14 |

FOREIGN PATENT DOCUMENTS

| | | |
|---|---|---|
| CN | 202080004186.1 | 7/2020 |
| CN | 112512884 | 3/2021 |

\* cited by examiner

*Primary Examiner* — Sizo B Vilakazi
(74) *Attorney, Agent, or Firm* — WOMBLE BOND DICKINSON (US) LLP

(57) ABSTRACT

This disclosure provides systems and methods for providing a failsafe braking system to independently backup various braking controls, such as longitudinal control, stability control, and standstill control. For example, in addition to providing the longitudinal control, the stability control, and the standstill control in a primary braking system (PBS), a secondary braking system (SBS) may independently intervene a malfunctioning braking procedure (e.g., any one of the longitudinal control, the stability control, and the standstill control) of the PBS. The PBS malfunctions may be caused by power failure, actuation failure (e.g., failure of electric motor or otherwise loss of actuation pressure), or control failure (e.g., electronic control unit (ECU) or control circuitry failure). Thus, the SBS uses an independent set of power supply, actuation devices (e.g., motors, pumps, and/or valves), and provides a redundant control circuitry to back up the control circuitry of the PBS.

20 Claims, 16 Drawing Sheets

600

Braking Procedures 560

Primary Braking Procedures 610

| Longitudinal Control 612 | Stability Control 614 | Standstill Control 616 |
|---|---|---|
| Automatic Emergency Braking (AEB) 632 | Antilock Braking System (ABS) 636 | Hill Start Assist (HAS) 642 |
| Adaptive Cruise Control (ACC) 634 | Electronic Stability Control (ESC) 638 | Parking Brake Control (PBC) 644 |
| • • • | Traction Control System (TCS) 640 | • • • |
| | • • • | |

Redundant Braking Procedures 620

| Longitudinal Control 622 | Stability Control 624 | Standstill Control 626 |
|---|---|---|
| Automatic Emergency Braking (AEB) 633 | Antilock Braking System (ABS) 637 | Hill Start Assist (HAS) 643 |
| Adaptive Cruise Control (ACC) 635 | Electronic Stability Control (ESC) 639 | Parking Brake Control (PBC) 645 |
| • • • | Traction Control System (TCS) 641 | • • • |
| | • • • | |

FIG. 6

FAILSAFE BRAKING SYSTEMS WITH INDEPENDENT BRAKING ACTUATIONS FOR AUTONOMOUS OR ASSISTED DRIVING VEHICLES

TECHNICAL FIELD

Embodiments of the present disclosure relate generally to operating autonomous driving vehicles. More particularly, embodiments of the disclosure relate to braking systems and the controls.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Brake control is a critical operation. As most autonomous or assisted driving (AD) vehicles use electrical power to operate the braking system (e.g., either indirectly via a hydraulic/pneumatic system in which an electrical motor powers a pump or a valve; or directly actuating a component that causes friction). The braking system may fail if either the electrical power supply (e.g., the batteries and/or power supply circuitry), or an actuator (e.g., an electrical motor driving pumps or a hydraulic/pneumatic system that provides braking actuation pressures) malfunctions, among other failure possibilities. Because human intervention is not expected or presumed in an AD vehicle, a reliable backup or failsafe braking system is necessary. Due to its backup nature, conventional backup braking systems provide only some of the operation controls corresponding to those in the primary braking system.

SUMMARY

The present disclosure provides systems and methods for providing a failsafe braking system to independently backup various braking controls, such as longitudinal control, stability control, and standstill control. For example, in addition to providing the longitudinal control, the stability control, and the standstill control in a primary braking system (PBS), a secondary braking system (SBS) may independently intervene a malfunctioning braking procedure (e.g., any one of the longitudinal control, the stability control, and the standstill control) of the PBS. The PBS malfunctions may be caused by power failure, actuation failure (e.g., failure of electric motor or otherwise loss of actuation pressure), or control failure (e.g., electronic control unit (ECU) or control circuitry failure). Thus, the SBS uses an independent set of power supply, actuation devices (e.g., motors, pumps, and/or valves), and provides a redundant control circuitry to back up the control circuitry of the PBS.

According to a first aspect, an embodiment of the disclosure provides a braking system for a computer assisted driving vehicle. The braking system includes a first braking sub-system powered by a first power source. The first braking sub-system includes a first electric motor to generate a first pressure providing hydraulic power to two or more sets of braking actuators. The first braking sub-system includes a first multiple valves receiving the hydraulic power and operable to vary respective actuating braking pressures at the two or more sets of braking actuators. The first braking sub-system includes a controlling device to operate the first multiple valves for varying the respective actuating braking pressures. The controlling device controls the two or more sets of braking actuators to independently perform primary braking procedures including at least: (1) a primary longitudinal control, (2) a primary stability control, and (3) a primary standstill control. The first braking sub-system includes multiple sensors for monitoring the primary braking procedures. The braking system includes at least one switch valve to switch the first braking sub-system to a second braking sub-system upon detecting, by the controlling device via multiple sensors, that at least one of the primary braking procedures is malfunctioning.

According to a second aspect, an embodiment of the disclosure provides a method for providing backup braking to an autonomous driving vehicle (ADV). The method includes powering a first braking sub-system with a first power source. The method includes generating a first pressure with a first electric motor to provide hydraulic power to two or more sets of braking actuators. The method includes transferring the hydraulic power to a first multiple valves to vary respective actuating braking pressures at the two or more sets of braking actuators, wherein the first multiple valves comprising at least one switch valve. The method includes operating, by a controlling device, the first multiple valves for varying the respective actuating braking pressures. The controlling device controls the two or more sets of braking actuators to independently perform primary braking procedures including at least: (1) a primary longitudinal control, (2) a primary stability control, and (3) a primary standstill control. The method includes monitoring the primary braking procedures with multiple sensors, and upon detecting that at least one of the primary braking procedures is malfunctioning, switching, by at least one switch valve, a braking operation to a second braking sub-system independent from the first power source. The method includes generating, by a second electric motor independent from the first electric motor, a second pressure providing the hydraulic power, by switching the at least one switch valve, to the two or more sets of braking actuators. The method includes independently providing, via a second multiple valves controlled by the controlling device, backup braking procedures at the two or more sets of braking actuators, wherein the backup braking procedures correspond to the malfunctioning at least one of the primary braking procedures.

According to a third aspect, an embodiment of the disclosure provides a non-transitory machine-readable medium having instructions stored therein for providing backup braking to an autonomous driving vehicle (ADV), which when executed by a processor, cause the processor to perform operations. The operations include powering a first braking sub-system with a first power source; generating a first pressure with a first electric motor to provide hydraulic power to two or more sets of braking actuators. The operations include transferring the hydraulic power to a first multiple valves to vary respective actuating braking pressures at the two or more sets of braking actuators, wherein the first multiple valves comprising at least one switch valve. The operations include operating, by the processor, the first multiple valves for varying the respective actuating braking pressures. The processor controls the two or more sets of braking actuators to independently perform primary braking procedures including at least: (1) primary longitudinal control, (2) primary stability control, and (3) primary standstill control. The operations include monitoring the primary braking procedures with a multiple sensors. The operations include, upon detecting that at least one of the primary braking procedures is malfunctioning, switching, by at least one switch valve, a braking operation to a second braking sub-system independent from the first power source. The operations include generating, by a second electric motor independent from the first electric motor, a second pressure providing the hydraulic power, by switching the at least one switch valve, to the two or more sets of braking actuators. The operations include independently providing, via a second multiple valves controlled by the processor, backup braking procedures at the two or more sets of braking actuators. The backup braking procedures correspond to the malfunctioning at least one of the primary braking procedures.

BRIEF DESCRIPTION OF THE DRAWINGS

Embodiments of the disclosure are illustrated by way of example and not limitation in the figures of the accompanying drawings in which like references indicate similar elements.

FIG. 6 illustrates an example block diagram of braking procedures provided by the PBS and the SBS of FIG. 5, in accordance with aspects of the present disclosure.

Like reference numerals indicate like elements.

DETAILED DESCRIPTION

Figure 1:
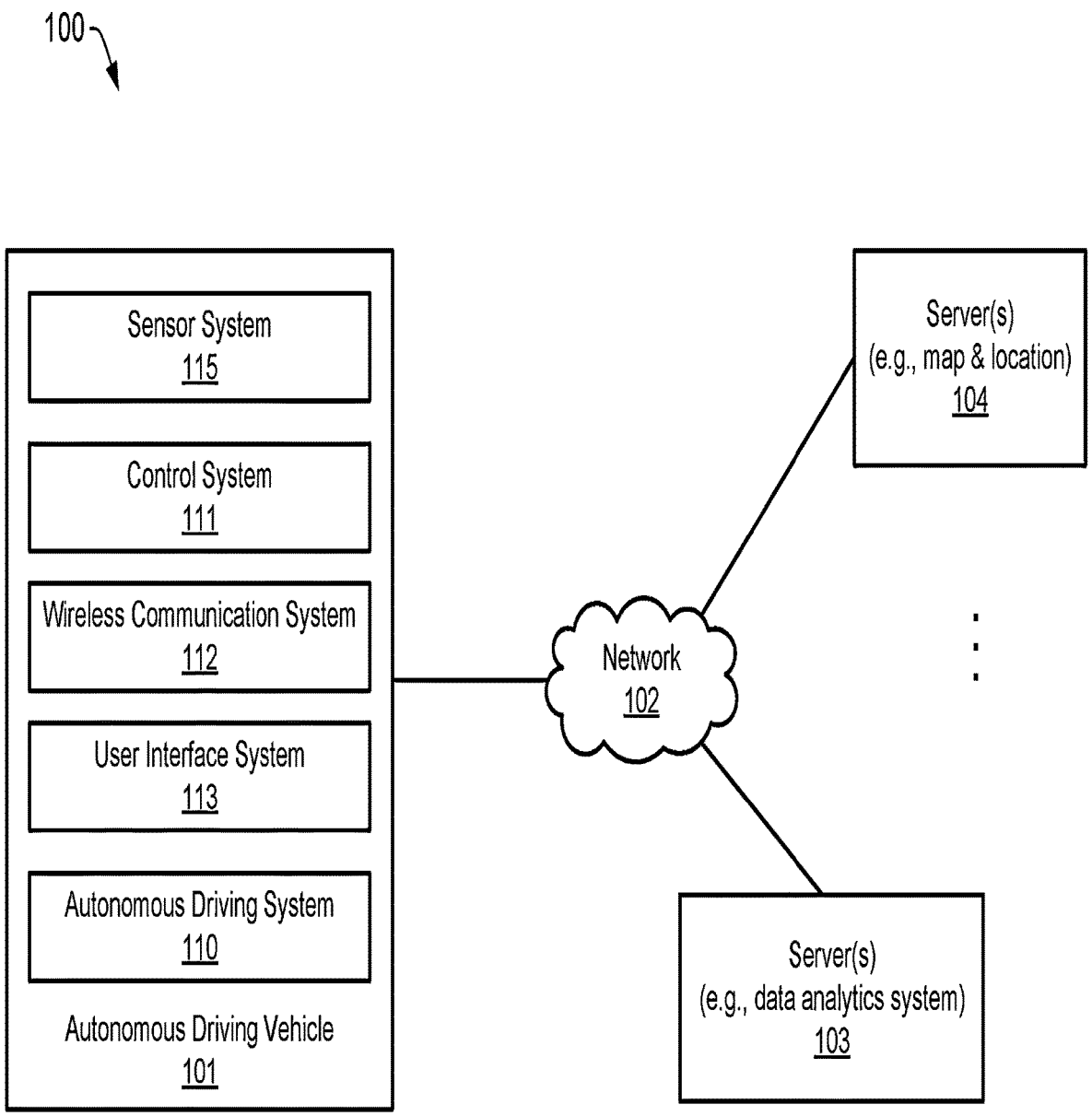
FIG. 1 is a block diagram illustrating a networked system, in accordance with aspects of the present disclosure.

Various embodiments and aspects of the disclosures will be described with reference to the details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, the present disclosure provides systems and methods for providing a failsafe braking system to independently back up various braking controls, such as longitudinal control, stability control, and standstill control. For example, in addition to providing the longitudinal control, the stability control, and the standstill control in a primary braking system (PBS), a secondary braking system (SBS) may independently intervene a malfunctioning braking procedure (e.g., any one of the longitudinal control, the stability control, and the standstill control) of the PBS. The PBS malfunctions may be caused by power failure, actuation failure (e.g., failure of electric motor or otherwise loss of actuation pressure), or control failure (e.g., electronic control unit (ECU) or control circuitry failure). Thus, the SBS uses an independent set of power supply, actuation devices (e.g., motors, pumps, and/or valves), and provides a redundant control circuitry to back up the control circuitry of the PBS.

According to aspects of the present disclosure, a braking system for a computer assisted driving vehicle (e.g., an autonomous driving vehicle or an assisted driving vehicle) may include a first braking sub-system (e.g., a PBS) and a second braking sub-system (e.g., an SBS) as a failsafe backup for the first braking sub-system. The first braking sub-system is powered by a first power source and includes a first electric motor to generate a first pressure providing hydraulic power to two or more sets of braking actuators (e.g., acting upon rotors of the wheels of the vehicle). The first braking sub-system includes a first set of valves that receives the hydraulic power and is operable to vary the respective actuating braking pressures at the two or more sets of braking actuators. The first braking sub-system includes a controlling device to operate the first set of valves to independently perform primary braking procedures including at least a primary longitudinal control, a primary stability control, and a primary standstill control. The first braking sub-system includes a number of sensors for monitoring the primary braking procedures.

The braking system further includes at least one switch valve to switch the first braking sub-system to a second braking sub-system upon detecting by the controlling device via the plurality of sensors, at least one of the primary braking procedures is malfunctioning. The second braking sub-system is independent from the first power source and includes a second electric motor, independent from the first electric motor, to generate a second pressure providing the hydraulic power by switching the at least one switch valve to operate the two or more sets of braking actuators. The second braking sub-system includes a second set of valves controlled by the controlling device or a redundant controlling device. The second set of valves is operable to independently provide backup braking procedures at the two or more sets of braking actuators. The backup braking procedures correspond to the malfunctioning at least one of the primary braking procedures (e.g., any one of the longitudinal control, stability control, and standstill control).

At a high level, longitudinal control includes adaptive cruise control (ACC), automatic emergency braking (AEB), vehicle platooning, and the like. Stability control includes anti-lock braking systems (ABS), traction control systems (TCS), electronic stability control (ESC), and the like. And standstill control includes auto-hold (AH), hill start assist (HSA), parking brake control (PBC), and the like. The controlling device may determine, based on various measurements (e.g., wheel rotation, vehicle deceleration, vehicle rotation, obstacle information, etc.) an operation status (e.g., a corresponding pressure for braking) for each of the two or more sets of braking actuators. For example, the controlling device may decrease the braking pressure in a braking actuator when the corresponding wheel starts to suddenly rotate at a lower rate than other wheels (e.g., indicating a lock-up) during ABS operations. As such and disclosed herein, both the first braking sub-system and the second braking sub-system have independent control on each of the two or more sets of braking actuators to provide the different redundant braking control procedures.

The disclosed method may be implemented in autonomous driving or assisted driving vehicles (ADVs), as well as human-operated vehicles that use an electrical booster to regulate the braking system. The example method may be implemented by a computer (e.g., an electronic control unit (ECU)) for providing backup braking. The example method may include detecting malfunctioning of at least one of a power source, an actuator, or a motor in the primary braking system (PBS) in at least one of longitudinal control, stability control, or standstill control. Upon detecting the malfunctioning, the ADV may switch, by using at least one switch valve, a braking operation to a secondary braking system (SBS) independent from the PBS. The at least one switch valve separates the hydraulic power in the PBS form the SBS. The SBS then provides an independent redundant control in view of the at least one of the longitudinal control, stability control, or standstill control associated with the detected malfunctioning.

In existing practice, backup or failsafe secondary braking systems do not provide independent controls for various (e.g., only a subset thereof) braking control procedures available in the primary braking system. For example, even though most primary braking systems have longitudinal control, stability control, and/or standstill control, not each of the controls enjoy a redundant backup. As a result, most backup braking systems do not have ABS, TCS, AEB, etc., even when the PBS is equipped with such. In addition, some SBS may use or rely on the hydraulic power or controller of the PBS, sharing one or more points of failures. The present disclosure provides example systems and methods to provide independent backup braking controls in a secondary braking system, which is independently powered and hydraulically separated from the PBS during operation. As such, the disclosed secondary braking system provides a reliable fallback to the primary braking system in ADVs.

FIG. 1 is a block diagram illustrating an autonomous driving network configuration, in accordance with aspects of the present disclosure of the disclosure. Referring to FIG. 1, network configuration 100 includes autonomous driving vehicle (ADV) 101 that may be communicatively coupled to one or more servers 103-104 over a network 102. Although there is one ADV shown, multiple ADVs can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An ADV refers to a vehicle that can be configured to in an autonomous mode in which the vehicle navigates through an environment with little or no input from a driver. Such an ADV can include a sensor system having one or more sensors that are configured to detect information about the environment in which the vehicle operates. The vehicle and its associated controller(s) use the detected information to navigate through the environment. ADV 101 can operate in a manual mode, a full autonomous mode, or a partial autonomous mode.

In one embodiment, ADV 101 includes, but is not limited to, autonomous driving system (ADS) 110, vehicle control system 111, wireless communication system 112, user interface system 113, and sensor system 115. ADV 101 may further include certain common components included in ordinary vehicles, such as, an engine, wheels, steering wheel, transmission, etc., which may be controlled by vehicle control system 111 and/or ADS 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
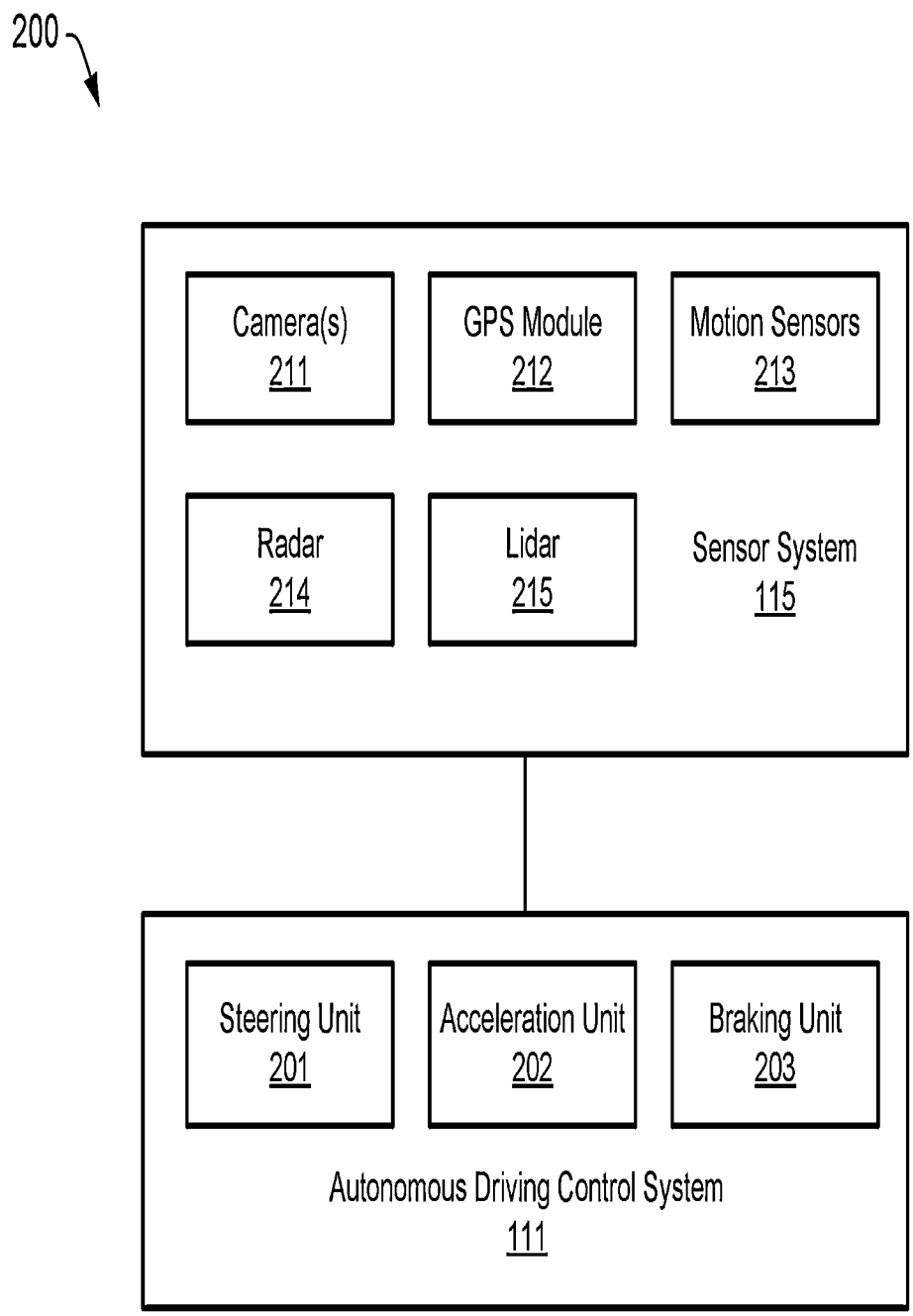
FIG. 2 is a block diagram illustrating an example of an autonomous/assisted driving (AD) vehicle, in accordance with aspects of the present disclosure.

Referring now to FIG. 2, in one embodiment, sensor system 115 includes, but it is not limited to, one or more cameras 211, global positioning system (GPS) unit or module 212, motion sensors 213 (e.g., an inertial measurement unit (IU), an accelerometer, etc.), radar unit 214, and a light detection and range (LIDAR) unit 215. The GPS module 212 may include a transceiver operable to provide information regarding the position of the ADV. The motion sensors 213 may sense position and orientation changes of the ADV based on inertial acceleration. Radar unit 214 may represent a system that utilizes radio signals to sense objects within the local environment of the ADV. In some embodiments, in addition to sensing objects, radar unit 214 may additionally sense the speed and/or heading of the objects. LIDAR unit 215 may sense objects in the environment in which the ADV is located using lasers. LIDAR unit 215 could include one or more laser sources, a laser scanner, and one or more detectors, among other system components. Cameras 211 may include one or more devices to capture images of the environment surrounding the ADV. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the ADV. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, a steering unit 201, an acceleration unit 202, and a braking unit 203 (also referred to as the braking system 203). The steering unit 201 is to adjust the direction or heading of the vehicle. The acceleration unit 202 is to control the speed of the motor or engine that in turn controls the speed and acceleration of the vehicle. The steering unit 201 and the acceleration unit 202 may be coupled, in part, with the AD control 510 of FIG. 5. The braking unit 203 is to decelerate the vehicle by providing friction to slow the wheels or tires of the vehicle. The braking unit 203 may be coupled, in part, with the brake control module 308 of FIG. 3. As further discussed in FIG. 5, the braking unit 203 may include a primary braking system (PBS) 510 and a secondary braking system (SBS) 520, which is a redundant, backup braking system of the PBS. Note that the components as shown in FIG. 2 may be implemented in hardware, software, or a combination thereof.

Referring back to FIG. 1, wireless communication system 112 is to allow communication between ADV 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of ADV 101 may be controlled or managed by ADS 110, especially when operating in an autonomous driving mode. ADS 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, ADS 110 may be integrated with vehicle control system 111.

For example, a user as a passenger may specify a starting location and a destination of a trip, for example, via a user interface. ADS 110 obtains the trip related data. For example, ADS 110 may obtain location and route data from an MPOI server, which may be a part of servers 103-104. The location server provides location services and the MPOI server provides map services and the POIs of certain locations. Alternatively, such location and MPOI information may be cached locally in a persistent storage device of ADS 110.

While ADV 101 is moving along the route, ADS 110 may also obtain real-time traffic information from a traffic information system or server (TIS). Note that servers 103-104 may be operated by a third party entity. Alternatively, the functionalities of servers 103-104 may be integrated with ADS 110. Based on the real-time traffic information, MPOI information, and location information, as well as real-time local environment data detected or sensed by sensor system 115 (e.g., obstacles, objects, nearby vehicles), ADS 110 can plan an optimal route and drive vehicle 101, for example, via control system 111, according to the planned route to reach the specified destination safely and efficiently.

Figure 3:
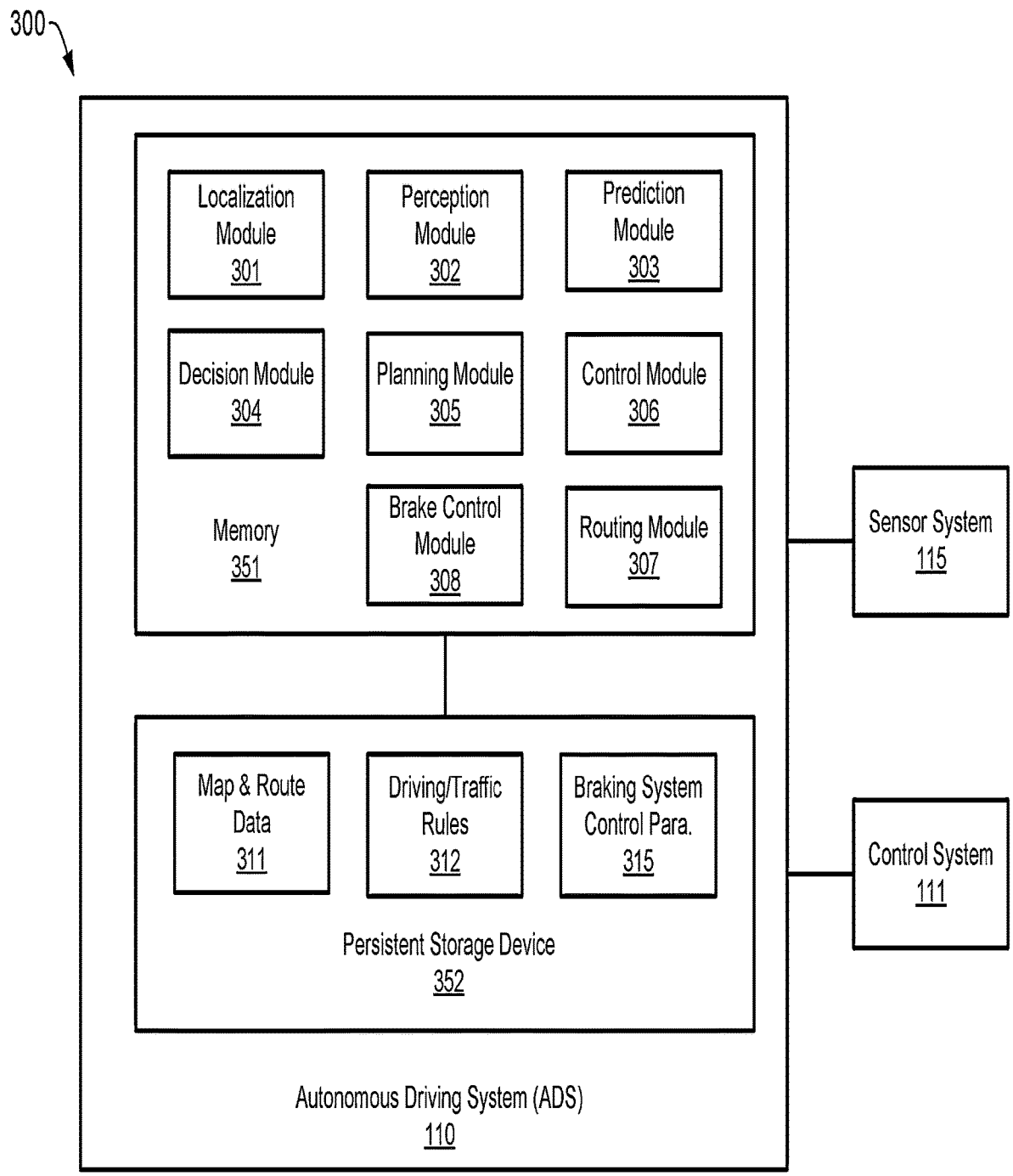
FIG. 3 is a block diagram illustrating an example of an AD system for an autonomous driving vehicle, in accordance with aspects of the present disclosure.

FIG. 3 is a block diagram illustrating an example of an AD system for an autonomous driving vehicle. The system 300 may be implemented as a part of ADV 101 of FIG. 1 including, but is not limited to, ADS 110, control system 111, and sensor system 115. Referring to FIG. 3, the ADS 110 includes, but is not limited to, a localization module 301, a perception module 302, a prediction module 303, a decision module 304, a planning module 305, a control module 306, a routing module 307, and a brake control module 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module.

The localization module 301 determines a current location of the ADV 300 (e.g., leveraging GPS module 212) and manages any data related to a trip or route of a user. The localization module 301 (also referred to as a map and route module) manages any data related to a trip or route of a user. A user may log in and specify a starting location and a destination of a trip, for example, via a user interface. The localization module 301 communicates with other components of the ADV 300, such as map and route data 311, to obtain the trip related data. For example, the localization module 301 may obtain location and route data from a location server and a map and POI (MPOI) server. A location server provides location services and an MPOI server provides map services and the POIs of certain locations, which may be cached as part of map and route data 311. While the ADV 300 is moving along the route, the localization module 301 may also obtain real-time traffic information from a traffic information system or server.

Based on the sensor data provided by sensor system 115 and localization information obtained by the localization module 301, a perception of the surrounding environment is determined by the perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

The perception module 302 may include a computer vision system or functionalities of a computer vision system to process and analyze images captured by one or more cameras in order to identify objects and/or features in the environment of the ADV 300. The objects can include traffic signals, roadway boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. The perception module 302 can also detect objects based on other sensors data provided by other sensors such as a radar and/or LIDAR.

For each of the objects, the prediction module 303 predicts what the object will behave under the circumstances. The prediction is performed based on the perception data perceiving the driving environment at the point in time in view of a set of map/route information 311, traffic rules 312, and braking system control parameters 315. For example, if the object is a vehicle at an opposing direction and the current driving environment includes an intersection, the prediction module 303 will predict whether the vehicle will likely move straight forward or make a turn. If the perception data indicates that the intersection has no traffic light, the prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively. The prediction module 303 may calculate a rate of deceleration or stop distance based on the braking system control parameters 315 to determine a safe zone for driving at a desired speed. For example, some obstacles/vehicles or road conditions may cause the prediction module 303 to steer or decelerate to maintain the safe zone (e.g., clearance from other vehicles or obstacles). The braking control parameters 315 may include recorded deceleration data indicating an upper limit and/or environment correlated deceleration rates. In some cases, the braking system control parameters 315 may be used by both the PBS and the SBS.

For each of the objects, decision module 304 makes a decision regarding how to handle the object. For example, for a particular object (e.g., another vehicle in a crossing route) as well as its metadata describing the object (e.g., a speed, direction, turning angle), the decision module 304 decides how to encounter the object (e.g., overtake, yield, stop, pass). The decision module 304 may make such decisions according to a set of rules such as traffic rules or driving rules 312, which may be stored in the persistent storage device 352.

The routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. The routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line.

The topographic maps are then provided to the decision module 304 and/or planning module 305. The decision module 304 and/or planning module 305 may examine all of the possible routes to select and modify one of the most optimal routes in view of other data provided by other modules such as traffic conditions from the localization module 301, driving environment perceived by the perception module 302, and traffic condition predicted by the prediction module 303. The actual path or route for controlling the ADV may be close to or different from the reference line provided by the routing module 307 dependent upon the specific driving environment at the point in time.

Based on a decision for each of the objects perceived, the planning module 305 plans a path or route for the ADV, as well as driving parameters (e.g., distance, speed, and/or turning angle), using a reference line provided by the routing module 307 as a basis. That is, for a given object, the decision module 304 decides what to do with the object, while the planning module 305 determines how to do it. For example, for a given object, decision module 304 may decide to pass the object, while the planning module 305 may determine whether to pass on the left side or right side of the object. Planning and control data is generated by planning module 305 including information describing how the vehicle 101 would move in a next moving cycle (e.g., next route/path segment). For example, the planning and control data may instruct the vehicle 101 to move 10 meters at a speed of 30 miles per hour (mph), then to change to a right lane at the speed of 25 mph.

Based on the planning and control data, the control module 306 controls and drives the ADV, by sending proper commands or signals to the vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, the planning module 305 plans a next route segment or path segment, for example, including a target position and the time required for the ADV to reach the target position. Alternatively, the planning module 305 may further specify the specific speed, direction, and/or steering angle, etc. In one embodiment, the planning module 305 plans a route segment or path segment for the next predetermined period of time such as 5 seconds. For each planning cycle, the planning module 305 plans a target position for the current cycle (e.g., next 5 seconds) based on a target position planned in a previous cycle. The control module 306 then generates one or more control commands (e.g., throttle, brake, steering control commands) based on the planning and control data of the current cycle.

Note that the decision module 304 and the planning module 305 may be integrated as an integrated module. The decision module 304/planning module 305 may include a navigation system or functionalities of a navigation system to determine a driving path for the ADV. For example, the navigation system may determine a series of speeds and directional headings to affect movement of the ADV along a path that substantially avoids perceived obstacles while generally advancing the ADV along a roadway-based path leading to an ultimate destination. The destination may be set according to user inputs via the user interface system 113. The navigation system may update the driving path dynamically while the ADV is in operation. The navigation system can incorporate data from a GPS system and one or more maps so as to determine the driving path for the ADV.

Figure 4:
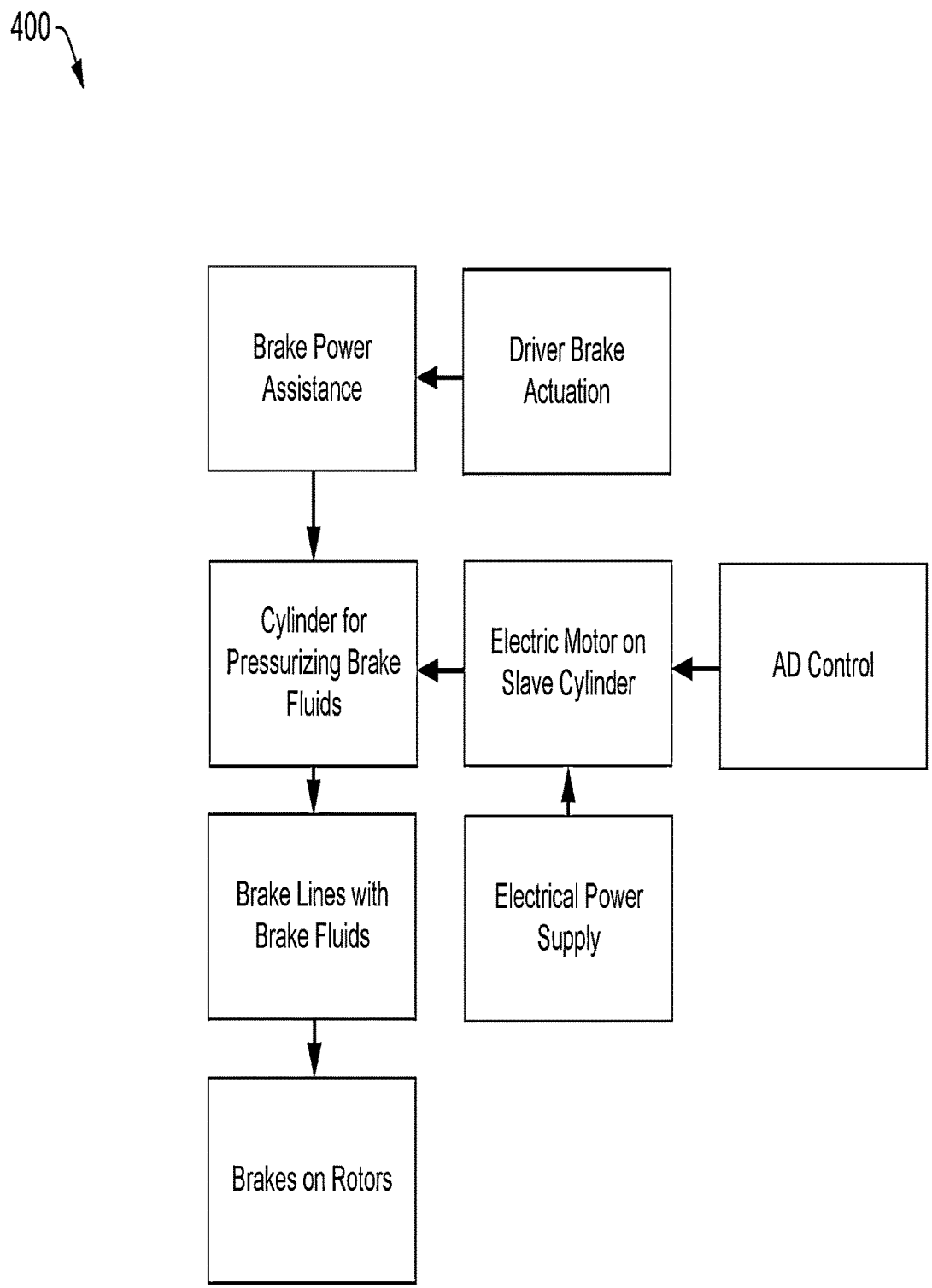
FIG. 4 is a block diagram illustrating an example of a braking system, in accordance with aspects of the present disclosure.
Figure 5:
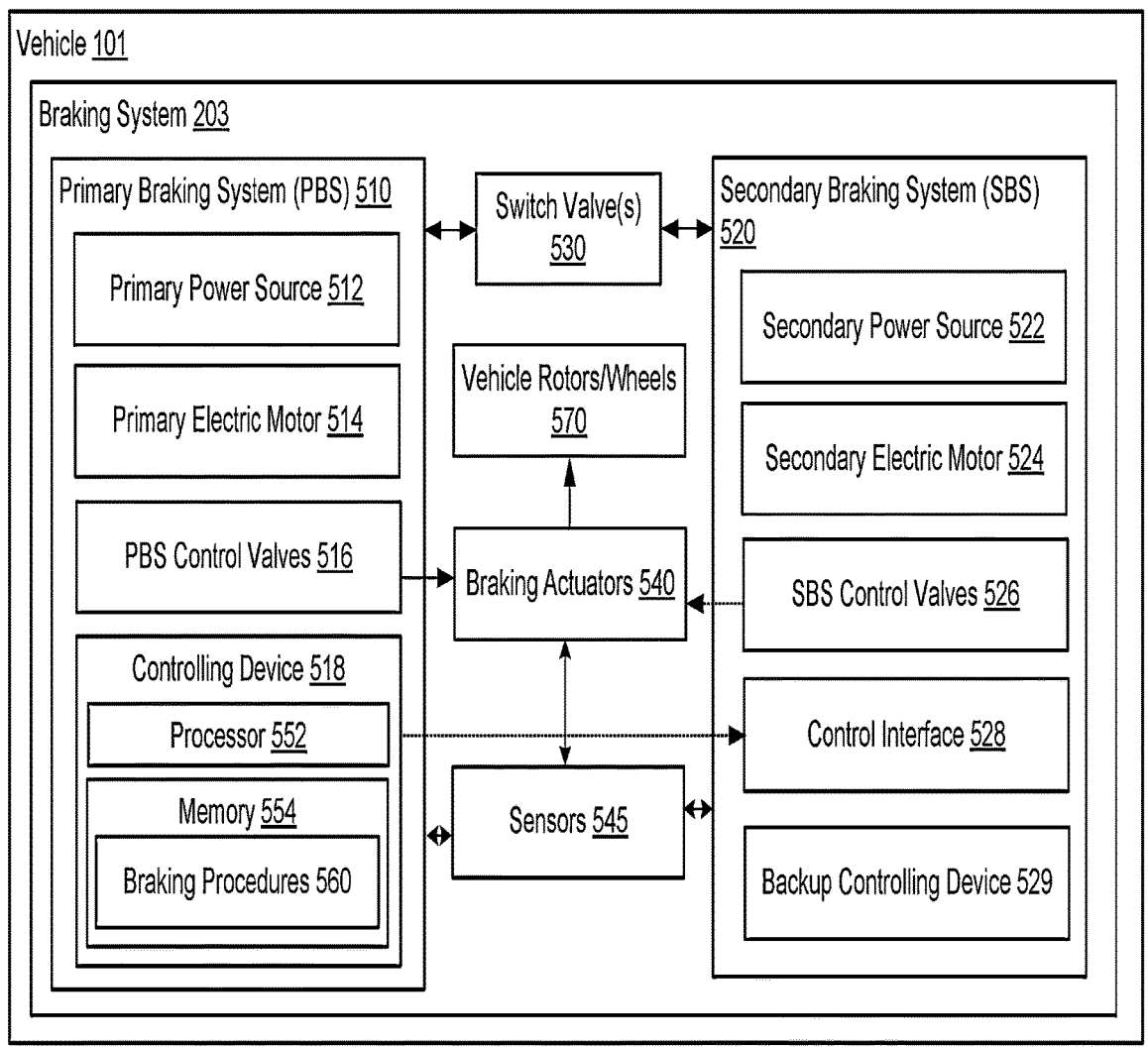
FIG. 5 is a block diagram illustrating implementations of a primary braking system (PBS) and a secondary braking system (SBS), in accordance with aspects of the present disclosure.

The brake control module 308 of FIG. 3 may be similar to (or functionally equivalent to) the brake control 520 of FIG. 5, in control of an example brake system 400 of FIG. 4. FIG. 4 is a block diagram illustrating an example of the braking system 400, in accordance with aspects of the present disclosure. As shown in FIG. 4, the braking system 400 includes at least a mechanism for receiving a braking actuation from a driver, a device for providing brake power assistance (e.g., a booster), a cylinder (e.g., a slave cylinder) for pressurizing brake fluids, an electrical motor on the master cylinder, one or more brake lines with brake fluids for transmitting braking power to one or more brakes on rotors of the vehicle. The braking system 400 may also include an electrical power supply, independent from or shared with the vehicle. The braking system 400 may include or in connection with the AD control (such as the AD control 510 of FIG. 5) that operates on the mentioned components/devices with sensor feedbacks therefrom.

Although illustrated separately, the device providing brake power assistance and the electric motor on the master cylinder may be integrated into a common device. For example, the brake actuation by the driver may provide direct actuation to the electric motor on the master cylinder. In other embodiments, the brake power assistance device may be a separate or independent (e.g., hydraulic) system to provide secondary control of the master cylinder, such as for emergency engagement by the driver when AD control does not operate as intended. As discussed herein, the brake control module 308 may reduce the power consumption by the electric motor on the master cylinder to conserve energy when the vehicle performs a traffic stop on a slope or gradient.

FIG. 5 is a block diagram 500 illustrating implementations of a primary braking system (PBS) 510 and a secondary braking system (SBS) 520, in accordance with aspects of the present disclosure. As shown, the ADV 101 includes the braking system 203, which includes the PBS 510 and the SBS 520. The braking system 203 also includes a number of switch valves 530 operable to switch between the PBS 510 and the SBS 520. The braking system 203 includes a number of braking actuators 540, each braking actuator 540 operable to apply a braking pressure on a rotor or wheel 570 of the ADV 101 to generate frictional forces to decelerate or stop the rotation thereof. The braking system 203 includes a number of sensors 545 for monitoring the operating conditions of the PBS 510, the SBS 520, the braking actuators 540, and other aspects of the braking system 203 and the vehicle 101 (e.g., rotations o the rotors or wheels 570, the switch valves 530, the orientations and rotations of the vehicle 101, etc.).

The PBS 510 may be powered by a primary power source 512. The PBS 510 may include a primary electric motor 514 to generate a primary pressure (e.g., hydraulic or pneumatic) to provide hydraulic or pneumatic power to the braking actuators 540. The PBS 510 includes a number of PBS control valves that receives the hydraulic or pneumatic power and operable to vary respective actuating braking pressures at the braking actuators 540. The PBS 510 includes a controlling device 518 to operate the PBS control valves 516 for varying the respective actuating braking pressures at the braking actuators 540 during different braking procedures. For example, the controlling device 518 controls the braking actuators 540 to independently perform primary braking procedures including at least: (1) a primary longitudinal control, (2) a primary stability control, and (3) a primary standstill control (as further discussed in FIG. 6 below). The sensors 545 monitors the primary braking procedures and detects when the braking procedure and/or a related component malfunctions.

The braking system 203 includes at least one switch valve 530 configured to switch the PBS 510 to the SBS 520 upon detecting, by the controlling device 518 via the sensors 545, that at least one of the primary braking procedures is malfunctioning. The controlling device 518 may include a processor 552 and a non-transitory memory 554 coupled to the processor 552. The memory 554 may include instructions for the controlling device 518 to cause the PBS 510 or the SBS 520 to perform braking procedures 560 (e.g., primary braking procedures and backup/secondary braking procedures, as discussed in FIG. 6).

As shown in FIG. 5, the SBS 520 is independent from the PBS 510 and includes a secondary power source 522 and a secondary electric motor 524. The secondary electric motor 524 is independent from the primary electric motor 514. The SBS 520 includes a number of SBS control valves 526, which is configured to operate the braking actuators 540. For example, the SBS 520 may use the secondary electric motor 524 to generate a second pressure providing the hydraulic power. The SBS 520 switches at least one switch valve 530 to operate the braking actuators 540. As such, the SBS 520 may control the braking actuators 540 independent from the PBS 510.

In some embodiments, the SBS control valves 526 are controlled by the controlling device 518 and are operable to independently provide backup braking procedures at the braking actuators 540. The SBS 520 may also include a backup controlling device 529 to perform the braking control procedures in case the controlling device 518 fails. The SBS 520 may include a control interface 528 for the controlling device 518 to engage various components (e.g., the SBS control valves 526) of the SBS 520. In some cases, the control interface 528 may allow the backup controlling device 529 to synchronize control parameters with the controlling device 518. When the SBS 520 is engaged, the controlling device 518 may cause the SBS 520 to perform backup braking procedures correspond to the malfunctioning at least one of the primary braking procedures.

In some cases, the memory 554 coupled to the processor 552 stores instructions that are executable by the processor 552. The instructions, when executed, may cause the processor 552 to receive data of obstacle conditions and road conditions. When conditions for braking is detected or satisfied, the processor 552 may disengage a power supply to one or more motors of the vehicle 101 based on the data of obstacle conditions and road conditions. The one or more motors may include at least one electric motor or an internal combustion engine. The processor 552 may then engage the first braking sub-system of the braking system to perform one or more of the primary braking procedures by default. Upon detecting that that at least one of the primary braking procedures is malfunctioning by the controlling device 518 via the sensors 545, the controlling device 518 engages the SBS 520 to provide for a backup braking procedure corresponding to the malfunctioning primary braking procedure.

As shown in FIG. 5, the PBS control valves 516 and the SBS control valves 526 may respectively and independently control each of the braking actuators 540. Each of the braking actuators 540 respectively provides braking forces on each rotor or wheel 570 of the ADV 101. In some cases, the processor 552 and the memory 554 of the controlling device 518 are further to receive sensor data of rotation of each wheel of the ADV 101, and individually control, via the SBS control valves 526 each of the braking actuators 540 to perform various braking procedures. For example, the SBS 520 increases, in a secondary longitudinal control (e.g., AEB), a braking pressure when an emergency condition has been detected (e.g., imminent impact). The backup controlling device 529 may include a similar processor and memory as the processor 552 and the memory 554 of the controlling device 518 to provide backup braking procedures in case the controlling device 518 malfunctions.

In some cases, the SBS 520 may increase, in the secondary longitudinal control (e.g., ACC), the braking pressure to slow down the ADV 101 when a speed difference between the computer assisted driving vehicle and one or more surrounding vehicles exceeds a threshold value (e.g., due to downhill accelerations).

In some cases, the SBS 520 may reduce, in a secondary stability control (e.g., ABS), a braking pressure (e.g., via one of the braking actuators 540) on at least one wheel 570 when the at least one wheel 570 rotates slower than other wheels to indicate locking, as measured by one of the sensors 545.

In some cases, the SBS 520 increases, in the secondary stability control (e.g., ESC), a braking pressure on at least one wheel when a difference between a desired steering direction and a measured steering direction exceeds a threshold value (e.g., understeering or oversteering).

In some cases, the SBS 520 engages, in a secondary standstill control (e.g., HAS), a parking brake when an unintended wheel rotation has been detected. The parking brake applies a braking force for holding the ADV 101 still.

In aspects, the switch valves 530 may include (as further shown in FIGS. 12-13) a first actuation valve operable to separate the second braking sub-system from the first braking sub-system that comprises a master cylinder, when the second braking sub-system is engaged upon detecting, by the controlling device via the plurality of sensors, that at least one of the primary braking procedures is malfunctioning. The first actuation valve prevents the first pressure to apply to the second braking sub-system by switching from a primary position to a secondary position. For example, in the primary position, the first actuation valve provides hydraulic fluids from a master cylinder and a booster cylinder to the first plurality of valves; and in the secondary position, the first actuation valve shuts off hydraulic fluids from the master cylinder.

In some cases, the at least one switch valve 530 further includes a second actuation valve operable to switch between a free-flow position and a check valve position. The free-flow position is used during engagement of the second braking sub-system for receiving hydraulic fluids from the booster cylinder.

In aspects, the braking actuators 540 include a front-left braking actuator operable to apply a braking force on a front-left wheel of the computer assisted driving vehicle; a front-right braking actuator operable to apply a braking force on a front-right wheel of the computer assisted driving vehicle; a rear-left braking actuator operable to apply a braking force on a rear-left wheel of the computer assisted driving vehicle; and a rear-right braking actuator operable to apply a braking force on a rear-right wheel of the computer assisted driving vehicle. The PBS control valves 516 and the SBS control valves 526 are respectively operable to independently vary corresponding braking forces on the front-left, front-right, rear-left, and rear-right wheels. In some cases, the rear-left braking actuator and the rear-right braking actuator further include an electronic parking brake (EPB) respectively or jointly. For example, the EPB may be actuated to apply a braking pressure without continuous consumption of electricity.

FIG. 6 illustrates an example block diagram 600 of braking procedures 560 provided by the PBS 510 and the SBS 520 of FIG. 5, in accordance with aspects of the present disclosure. As shown, the redundant braking procedures 620 include independent and standalone control backups for each corresponding controls the primary braking procedures 610. The primary braking procedures 610 are tailored to hardware specifications of the PBS 510. Similarly, the redundant braking procedures 620 are tailored to hardware specifications of the SBS 520 and may achieve similar braking performance as the primary braking procedures 610. In view of the one-to-one correspondence, the braking procedures 610 and 620 are described together below.

Each of the primary and redundant braking procedures 610 and 620 includes longitudinal control 612 or 622, stability control 614 or 624, and standstill control 616 or 626. The longitudinal control 612 or 622 includes at least the automatic emergency braking (AEB) 632 or 633, and the adaptive cruise control (ACC) 634 or 635. For example, the ADV 101, when activating AEB 632 or 633, may apply additional braking pressure to prevent collision with obstacles in front of the ADV 101. In some cases, the additional braking pressure may be achieved by joining the output of both the braking pressures supplied by the PBS 510 and the SBS 520. During normal operations, the ADV 101 may operate under a deceleration limit in view of the comfort level of the passenger. The ADV 101 may detect unexpected obstacles that require a deceleration greater than the deceleration limit to prevent collision. In such cases, the ADV 101 (and the controlling device 518 thereof) activates the AEB to achieve a greater-than-normal deceleration to avoid the detected collision (or at least minimize the impact energy).

The ADV 101, when activating the ACC 634 or 635, may monitor unintended accelerations of the ADV 101 (e.g., due to wind or downhill conditions) during cruising. The cruising may be relative to other vehicles in traffic (e.g., platooning) and/or may be involving communications among multiple ADVs (e.g., in vehicle-to-everything (V2X) communications). Upon detecting the unintended accelerations, the ADV 101 may activate the ACC 634 or 635 to reduce driving power output and to engage the braking actuators 540 to slow down the ADV 101 to a target speed.

The stability control 614 or 624 includes at least the antilock braking system (ABS) 636 or 637, the electronic stability control (ESC) 638 or 639, and the traction control system (TCS) 640 or 641. The ADV 101 may activate the ABS 636 or 637 when, during braking, a wheel starts to rotate at a lower rate than others, indicating a lockup. The ABS 636 or 637 operates to release the braking pressure on that wheel to prevent lockup and the associated grip reduction.

The ADV 101 may activate the ESC 638 or 639 when the traveling direction of the ADV 101 is different from an intended steering direction (e.g., understeering or oversteering). For example, the AV 101 measures traveling direction and orientation and compares the measurements with a desired or computed steering input to the wheels. When understeering or oversteering is detected (e.g., during a sharp turn for avoiding obstacles), the ADV 101 may activate the ESC 638 or 639 to apply individual braking on a wheel to correct the actual traveling orientation to the desired steering. During understeering, the ADV 101 exhibits a turning radius greater than that of the desired steering.

The ESC 638 or 639 thus applies braking to the rear wheel on the side closer to the turning center to correct the understeering. Similarly, during oversteering, the ADV 101 spins the rear end outwards (and exhibits a turning radius smaller than that of the desired steering). The ESC 638 or 639 thus applies braking to the front wheel away from the side of the turning center to correct the oversteering. As such, by monitoring the behavior of the ADV 101 and individually controlling wheel braking, the ESC 638 or 639 maintains the ADV 101 in desired turning trajectories.

The ADV 101 may activate the TCS 640 or 641 when one or more wheels slip against the ground. For example, by monitoring the vehicle velocity and the individual tire velocity relative to the ground, the ADV 101 may identify if one or more of the wheels 570 has lost traction relative to the ground (e.g., spinning or slipping). When the TCS 640 or 641 detects a wheel having lost traction, the TCS 640 or 641 may apply braking pressure via the corresponding braking actuators 540 to slow down the wheel for regaining traction. The operation principle of the TCS 640 or 641 is similar to that of the ABS 636 or 637, except that instead of releasing individual braking pressures in a wheel to prevent lockup, the TCS 640 or 641 increases braking pressures in a wheel to prevent slipping.

The standstill control 616 or 626 includes at least the hill start assist (HAS) 642 or 643 and the parking brake control (PBC) 644 or 645. For example, the ADV 101 may activate HAS 642 or 643 during hill start, such as when a delay of the driving power transfer causes ADV 101 to unintendedly move on the hill. The HAS 642 or 643 applies a braking pressure to counteract the unintentional movement while releases the braking pressure once the intended movement is detected.

The ADV 101 may activate the PBC 644 or 645 when prolonged parking has been detected. For example, the PBC 644 or 645 may activate parking brakes that do not consume electricity for applying parking braking pressures. The PBC 644 or 645 transfers the braking operation from normal braking (e.g., applying braking pressures via the braking actuators 540, which may require a continuous energy drain) to parking brakes for energy conservation. For example, the PBC 644 or 645 may apply or release a spring-loaded braking mechanism to apply the parking brakes (e.g., the spring-loaded braking mechanism providing the parking braking pressure without the braking actuators 540).

According to aspects of the present disclosure, independent power sources and individual braking control of each wheel are provided in both the PBS 510 and the SBS 520 to provide backup braking in the various braking procedures 610 and 620. That is, the SBS 520 provides an independent redundant braking procedure for each of the primary braking procedures 610 in case of a malfunction of the PBS 610 occurs. Furthermore, aspects of the present disclosure improve operation efficiency of the SBS 520 by minimizing the number of SBS control valves 526 when providing the redundant braking procedures, as illustrated in the examples in FIG. 8.

Figure 7:
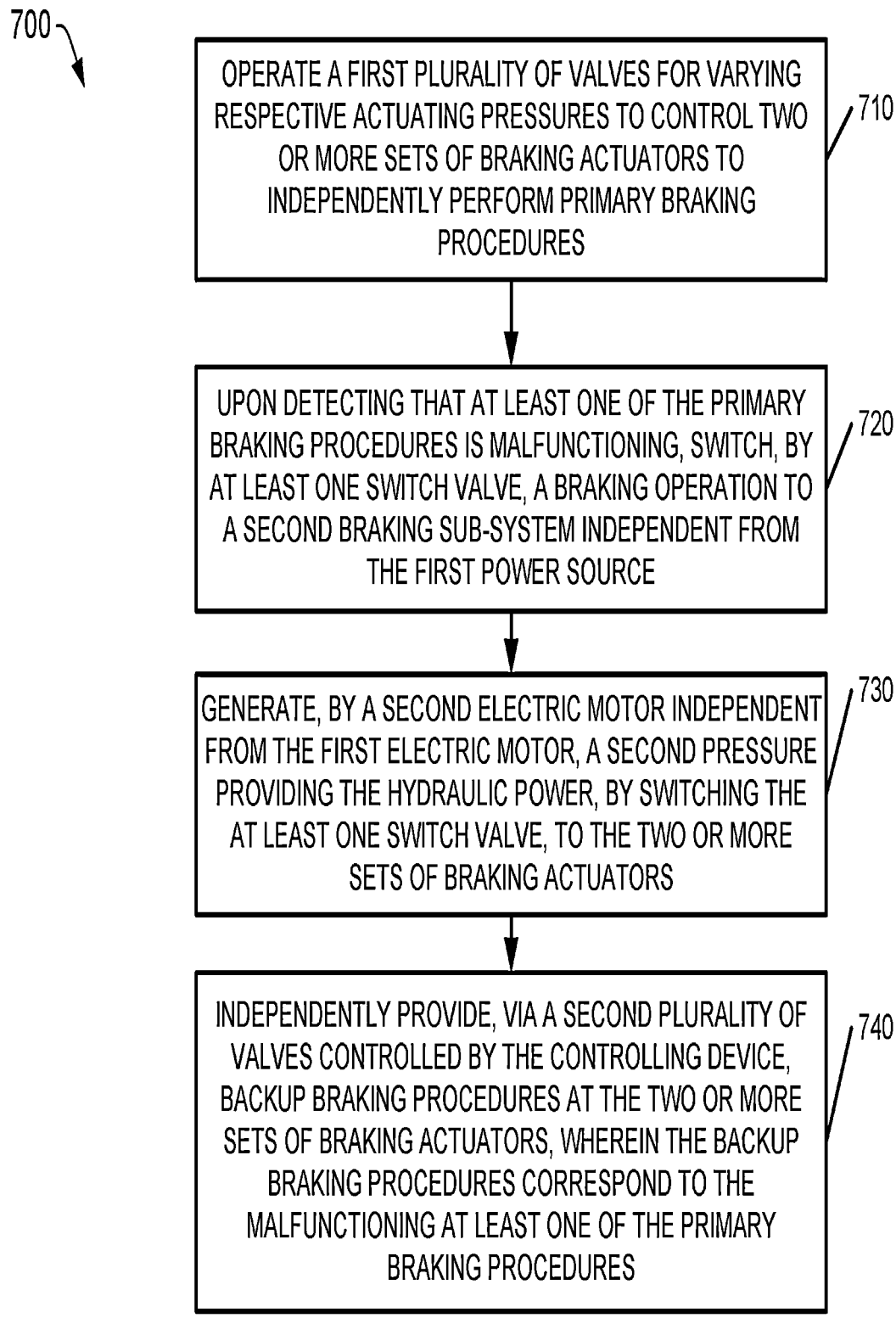
FIG. 7 is a flow diagram illustrating a method of providing an independent failsafe braking procedure in response to a malfunction of a primary braking procedure, in accordance with aspects of the present disclosure.

FIG. 7 is a flow diagram 700 illustrating a method of providing an independent failsafe braking procedure in response to a malfunction of a primary braking procedure, in accordance with aspects of the present disclosure. The method may be applicable to electric, hybrid, or internal combustion engine powered ADVs. The method may be performed by a processing logic (e.g., the ADS 110 of FIG. 3), which may include software, hardware, or a combination thereof. As an example, the method illustrated in the flow diagram 700 may be performed by the control module 306 of FIG. 3.

At operation 710, the control module operates a first number of valves for varying respective actuating pressures to control braking actuators to independently perform primary braking procedures. For example, the control module powers a first braking sub-system (e.g., the PBS 510) using a first power source (e.g., the primary power source 512 of FIG. 5). The control module generates a first pressure with a first electric motor to provide hydraulic power to the braking actuators. The hydraulic power is transferred to a first number of valves to vary respective actuating braking pressures at the braking actuators. The first number of valves includes at least one switch valve.

The control module may operate the first number of valves for varying the respective actuating braking pressures. The controlling device controls the braking actuators to independently perform primary braking procedures including at least: (1) a primary longitudinal control, (2) a primary stability control, and (3) a primary standstill control. The control module monitors the primary braking procedures with a plurality of sensors.

At operation 720, the control module, upon detecting that at least one of the primary braking procedures is malfunctioning, switches, by using the at least one switch valve, a braking operation to a second braking sub-system independent from the first power source.

At operation 730, the control module generates, by a second electric motor independent from the first electric motor, a second pressure providing the hydraulic power, by switching the at least one switch valve, to the braking actuators.

At operation 740, the control module independently provides, via a second number of valves controlled by the controlling device, backup braking procedures at the braking actuators. The backup braking procedures correspond to the malfunctioning at least one of the primary braking procedures.

In aspects, the control module may receive data of obstacle conditions and road conditions. The control module may disengage a power supply to one or more motors of the ADV based on the data of obstacle conditions and road conditions. The one or more motors may include at least one electric motor or an internal combustion engine. The control module may engage the first braking sub-system of the braking system to perform the primary braking procedures by default. The control module may engage the second braking sub-system upon detecting, via the plurality of sensors, that at least one of the primary braking procedures is malfunctioning.

In aspects, the control module may respectively and independently control, by the first number of valves and the second number of valves, each of the two or more braking actuators that respectively provides braking forces on each wheel of the ADV. The control module may receive sensor data of rotation of each wheel of the ADV; and individually control, via the second number of valves, when the second braking sub-system is engaged, each of the two or more braking actuators to perform various braking procedures. For example, the braking procedures may include increasing, in a secondary longitudinal control, the second pressure when an emergency condition has been detected; increasing, in the secondary longitudinal control, the second pressure to slow down the ADV when a speed difference between the ADV and one or more surrounding vehicles exceeds a threshold value; reducing, in a secondary stability control, a braking pressure on at least one wheel when the at least one wheel rotates slower than other wheels to indicate locking; increasing, in the secondary stability control, a braking pressure on at least one wheel when a difference between a desired steering direction and a measured steering direction exceeds a threshold value; or engaging, in a secondary standstill control, a parking brake when an unintended wheel rotation has been detected, wherein the parking brake applies a braking force for holding the ADV still.

In some cases, the control module switches the braking operation to the second braking sub-system by switching, at a second actuation valve from a check valve position to a free-flow position. The free-flow position is used during engagement of the second braking sub-system for receiving hydraulic fluids from the booster cylinder.

In some cases, the control module may switch, by the at least one switch valve, the braking operation to the second braking sub-system by separating, by a first actuation valve, the second braking sub-system from the first braking sub-system. The first braking system may include a master cylinder.

The control module may separate the sub-systems when the second braking sub-system is engaged upon detecting, by the controlling device via the plurality of sensors, that at least one of the primary braking procedures is malfunctioning. The first actuation valve may prevent the first pressure to apply to the second braking sub-system by switching from a primary position to a secondary position. For example, in the primary position, the first actuation valve provides hydraulic fluids from a master cylinder and a booster cylinder to the first plurality of valves. In the secondary position, the first actuation valve shuts off hydraulic fluids from the master cylinder. Details of the operations are illustrated in FIGS. 8-11.

Figure 8:
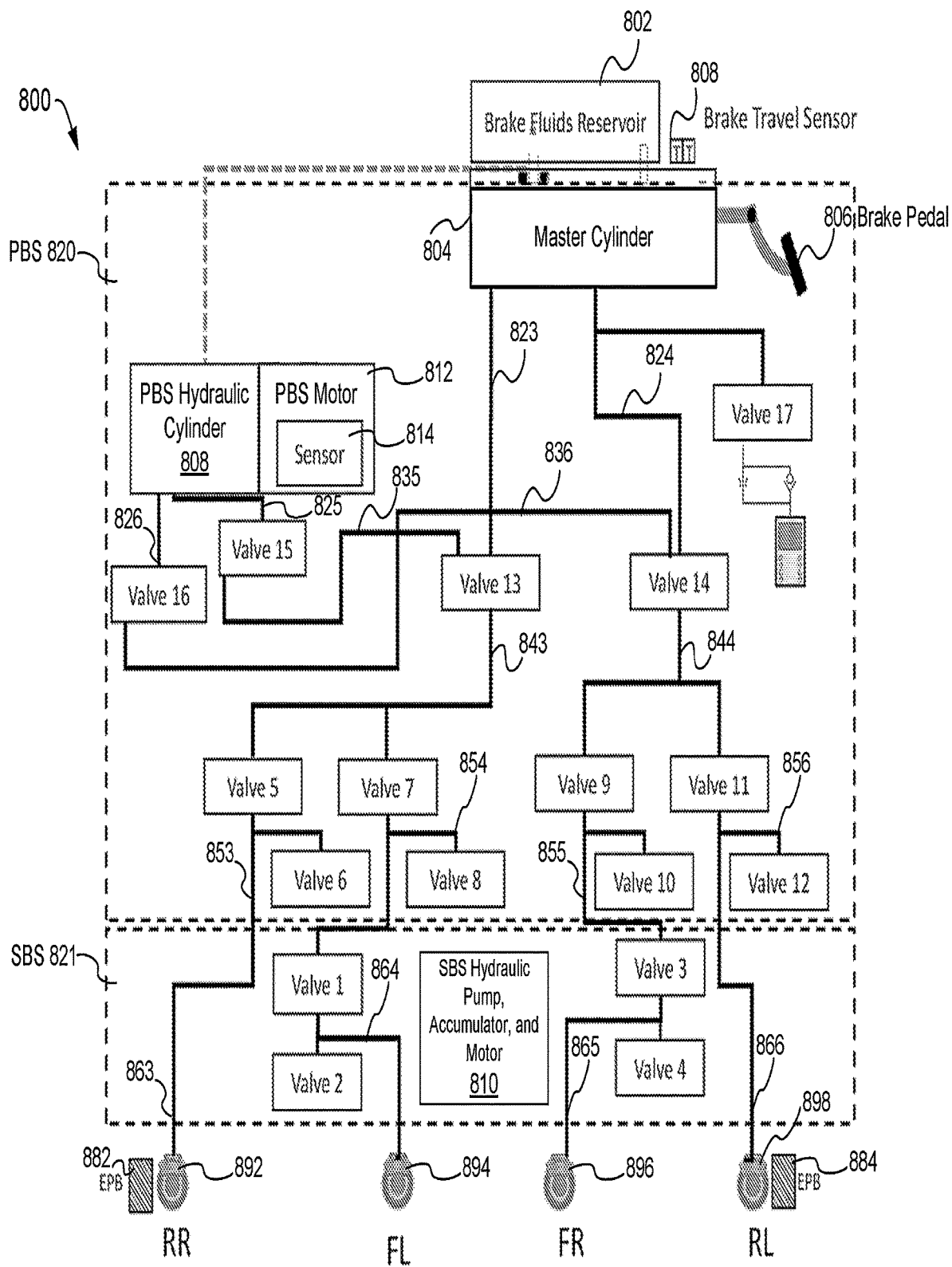
FIG. 8 illustrates an example schematics of a braking unit including a PBS and an SBS, in accordance with aspects of the present disclosure.

FIG. 8 illustrates an example schematics of a braking unit 800 including a PBS 820 and an SBS 821, in accordance with aspects of the present disclosure. The braking unit 800 may be an example embodiment of the braking unit 203 of FIG. 2. For clarity, not all diagram blocks within the box 820 belong to the PBS 820. For example, some components illustrated in the box 820 may belong to a system level or shared with the SBS 821.

As shown, the PBS 820 includes a master cylinder 804. The master cylinder 804 might use an optional booster in some embodiments (e.g., the booster may amplify the pressure output of the master cylinder 804). The PBS 820 includes a PBS hydraulic cylinder 808 with a PBS motor 812. One or more sensors 814 may monitor the operating conditions of the PBS motor 812 and the cylinder 808. The SBS 821 includes an SBS hydraulic pump, accumulator, and motor 810 with an SBS motor (not separately labeled). One or more sensors (not shown) may monitor the operating conditions of the SBS motor and the SBS hydraulic pump, accumulator, and motor 810. In some cases, the SBS hydraulic pump, accumulator, and motor 810 and the SBS motor (assembly) may take the form of an ABS brake modulator in which a pump motor is integrated with one or more pumps and valves. The master cylinder 804, the PBS hydraulic cylinder 808, and the SBS hydraulic pump, accumulator, and motor 810 receive brake fluids from the brake fluids reservoir 802 (and return thereto).

The brake fluids transfer braking pressures from the cylinders 804, 808, and 810 to the brake actuators 892, 894, 896, and 898 (e.g., in the forms of pistons and friction pads for clamping down respective rotors to slow down wheel movements). The SBS hydraulic pump, accumulator, and motor 810 may provide backup braking pressures to the PBS hydraulic cylinder 808 when engaged, as discussed below.

Figure 9:
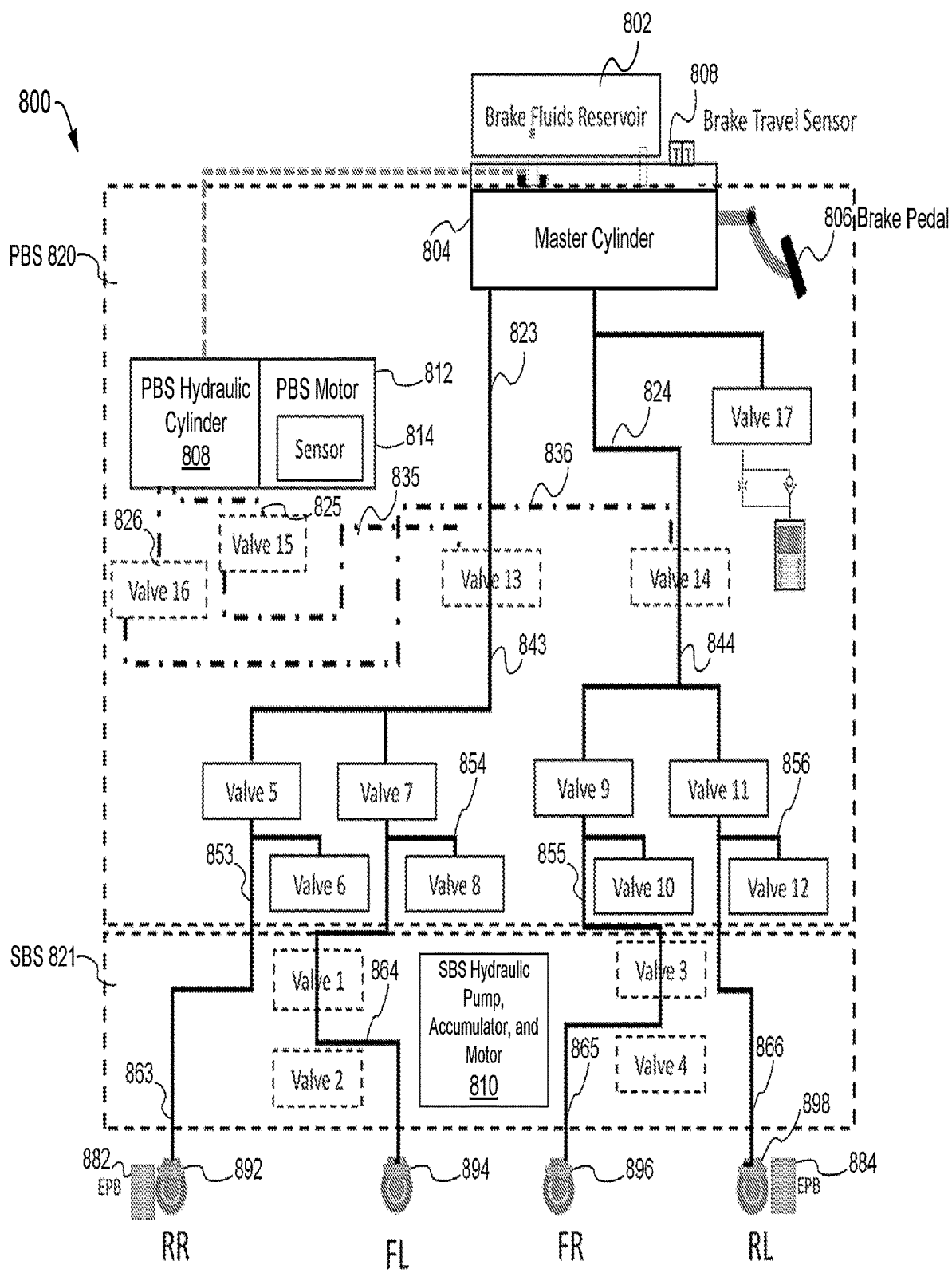
FIG. 9 illustrates the braking unit of FIG. 8 when the PBS operates properly, in accordance with aspects of the present disclosure.
Figure 12:
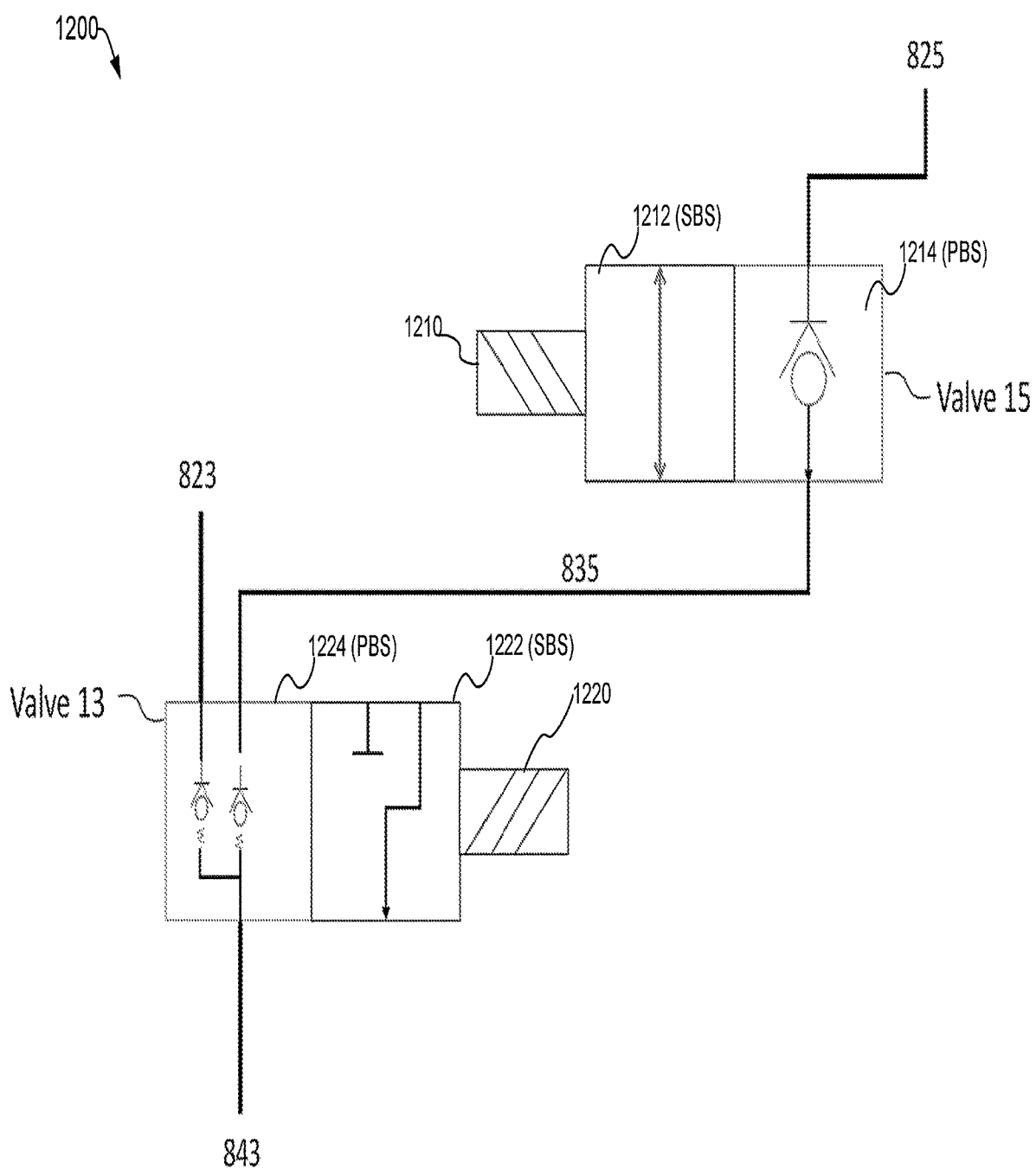
FIGS. 12-15 illustrate example embodiments of various valves applicable to the schematics in FIGS. 8-11, in accordance with aspects of the present disclosure.
Figure 13:
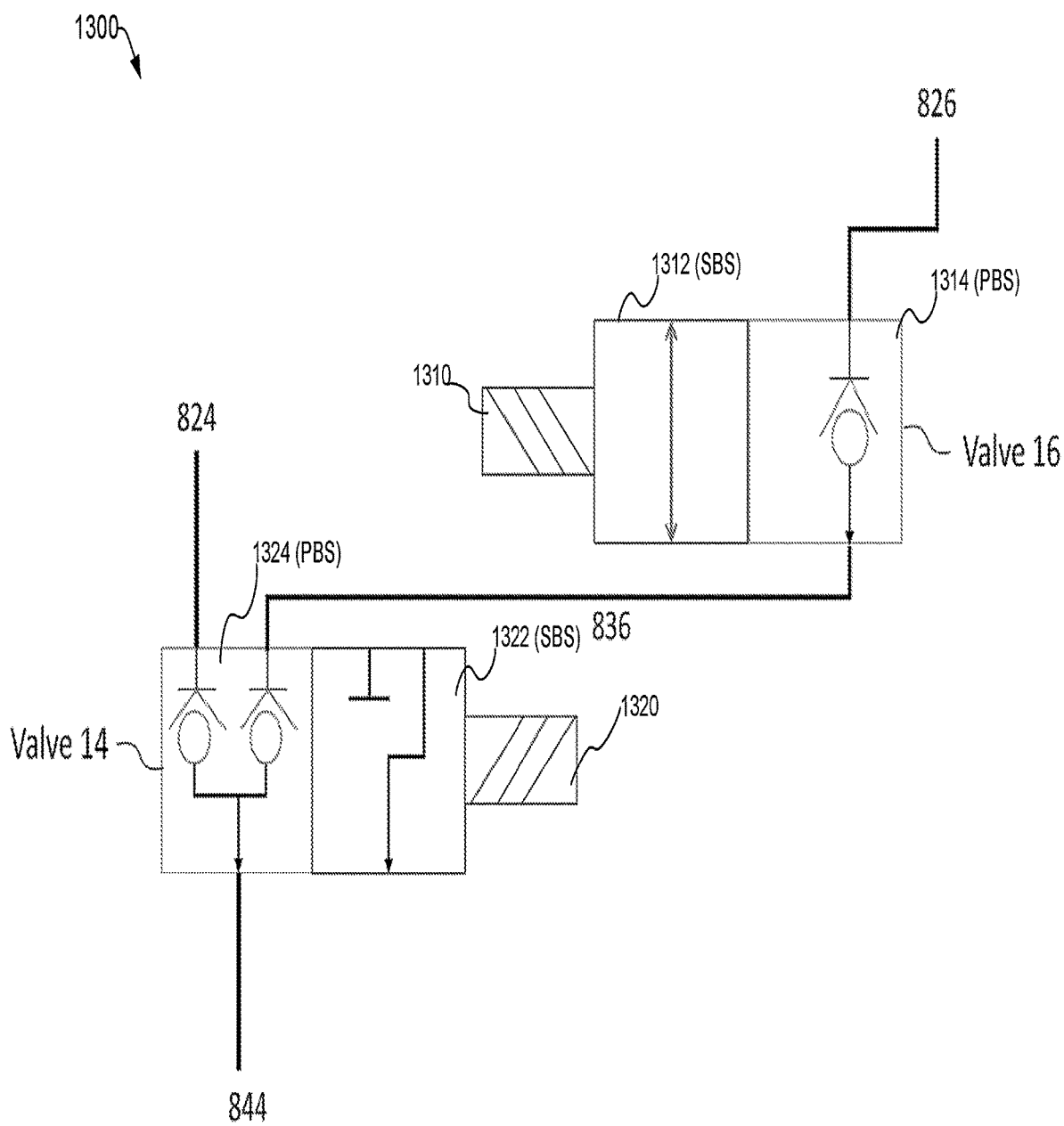

Turning now to FIG. 9 that illustrates the braking unit 800 of FIG. 8 when the PBS operates properly, in accordance with aspects of the present disclosure. As shown, during normal operation with the PBS 820, the switch valves 13-16 are set at default positions where the valves 13 and 14 allow the braking pressure supplied at the master cylinder 804 to a number of PBS control valves 5-12. For example, as shown in FIGS. 12 and 13, the valves 13 and 14 at default position include check valves that allow brake fluids to flow from the master cylinder 804 to the PBS control valves 5, 7, 9, and 11 via the conduits 823, 843, 824, and 844.

When the ADV 101 determines to brake, the controlling device (e.g., 518 in FIG. 5) of the ADV 101 operates the brake pedal 806 (e.g., PBS actuator) to increase the fluid pressure in the master cylinder 804. In some cases, the brake pedal 806 includes a motor driven piston coupled with a spring. In some cases, the brake pedal 806 includes or is coupled with a brake pedal for receiving human input for human-initiated braking operations. For example, the brake pedal 806 may include a brake travel sensor 808 for detecting the travel distance of the brake pedal and convert the measured distance into input for the brake pedal 806.

The check valves at the switch valves 13 and 14 prevents brake fluids returning to the master cylinder 804 via the conduits 823 and 824. During braking, the braking pressure reaches the braking actuators 892-898 via the conduits 843 and 844. As mentioned in FIG. 6 above, the different braking procedures are achieved by individually controlling the braking operations (e.g., increase or decrease of braking pressures) on each wheel. For example, as shown, the ADV 101 includes four wheels: rear right (RR), rear left (RL), front right (FR), and front left (FL). The conduits 843 and 844 respectively provide braking pressures to the wheels in a diagonal: the braking pressure on actuators 892 (RR) and 894 (FL) is supplied by the conduit 843; and the braking pressure on actuators 896 (FR) and 898 (RL) is supplied by the conduit 844.

To provide individual braking control on each of the RR, FL, FR, and RL wheels, each of the respective actuators 892, 894, 896, and 898 use two valves to increase and decrease the respective braking pressures. For example, on the actuator 892 for RR, the PBS control valve 5 connects the conduits 863 and 853 to the conduit 843 at a pass-through configuration 1412 (see FIG. 14). That is, by increasing the braking pressure at the master cylinder 804 (e.g., by the brake pedal 806, the braking pressure at the actuator 892 may be correspondingly increased. In some cases, if the ADV 101 determines that additional braking pressure is needed, the SBS hydraulic pump, accumulator, and motor 810 may further provide braking pressure input to the conduit 843 by joining at the valve 13 (see FIG. 12, where the SBS hydraulic pump, accumulator, and motor 810 may supply braking pressure via the conduits 825 and 835). FIG. 12 illustrates an example valve combination 1200 for the switch valves 13 and 15.

To decrease the braking pressure at the actuator 892, the PBS control valve 6 (see FIG. 14) may switch from a blocking configuration 1424 to a pass-through configuration 1422, directing the brake fluids back to the reservoir 802 (connecting line not shown in FIGS. 8-11). Similarly, each of the actuators 894, 896, and 898 is individually controlled by two valves: valves 7 and 8 via conduit 854 and 864 on the actuator 894, valves 9 and 10 via conduit 855 and 865 on the actuator 896, and valves 11 and 12 via conduit 856 and 866 on the actuator 898.

Figure 10:
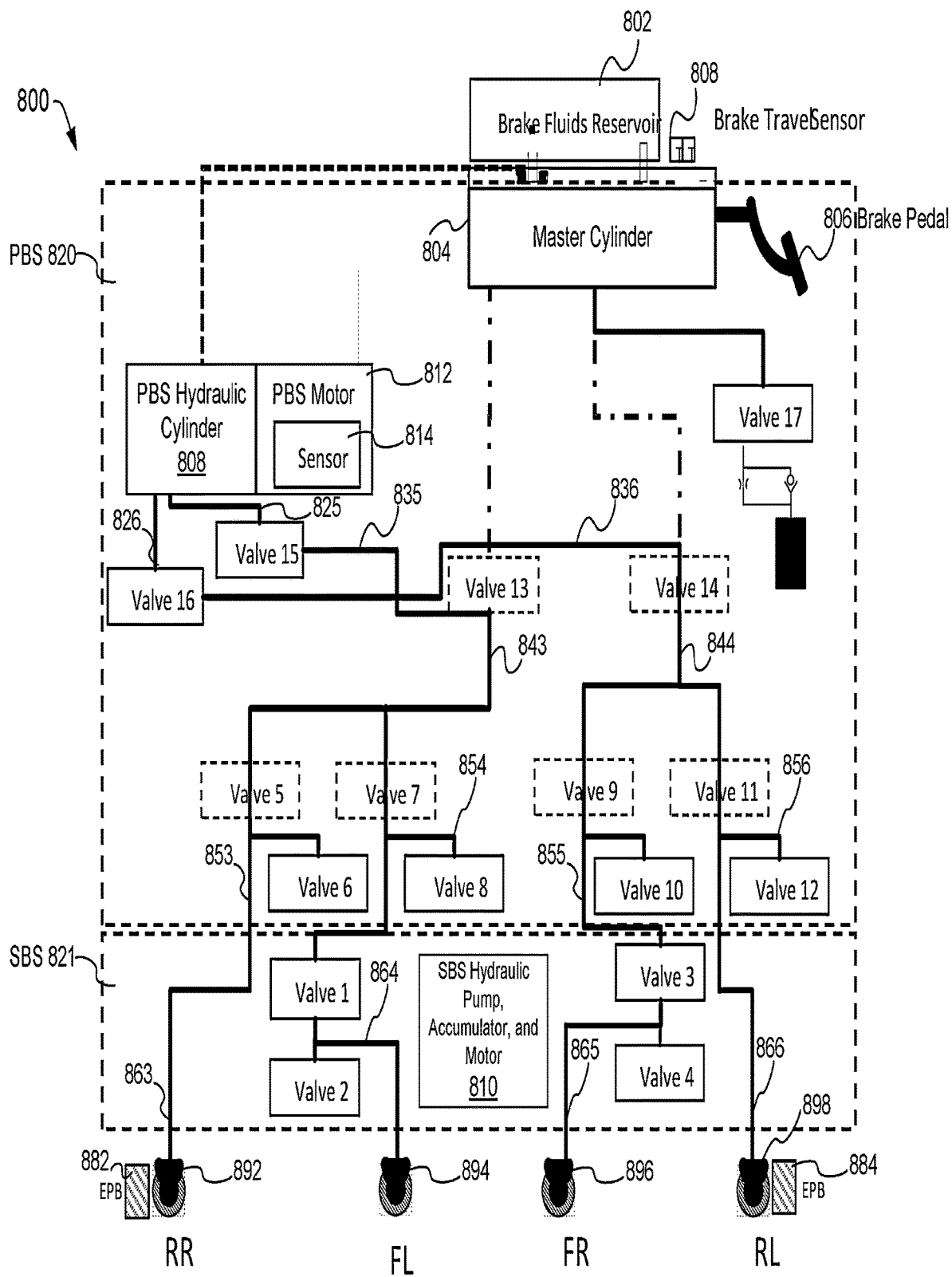
FIG. 10 illustrates the braking unit of FIG. 8 when the PBS malfunctions and the SBS engages, in accordance with aspects of the present disclosure.

Aspects of the present disclosure provide the SBS 821 individual redundant braking procedure backup for the PBS 820, unlike conventional backup braking systems that do not independently provide for various braking controls (e.g., longitudinal, stability, and standstill controls). FIG. 10 illustrates the braking unit 800 of FIG. 8 when the PBS 820 malfunctions and the SBS 821 engages, in accordance with aspects of the present disclosure. As shown, when the master cylinder 804 or the brake pedal 806 malfunctions, the ADV 101 may use the valves 13, 14, 15, and 16 to switch to the SBS hydraulic pump, accumulator, and motor 810 to supply the required braking pressure for controlling the actuators 892-898. The SBS motor may use a piston to increase the hydraulic pressure in the SBS hydraulic pump, accumulator, and motor 810.

When the SBS 821 is engaged, the SBS motor may receive instructions from the controlling device to generate a similar braking pressure in the SBS hydraulic pump, accumulator, and motor 810 as that in the master cylinder 804 if the master cylinder 804 had not malfunctioned.

Unlike conventional backup braking systems, the present disclosure provides the switching valves 13-16 to cut off the brake fluid supply from the master cylinder 804 when the SBS 821 is engaged. For example, as shown in FIG. 12, the switch valve 15 operates at two configurations: at the PBS (default) configuration 1214, the switch valve 15 provides a check valve to the conduit 825 (preventing diversion of the braking fluids from the master cylinder 804 to operate the PBS 820); at the SBS configuration 1212, the switch valve 15 allows the conduits 825 and 835 to be directly coupled with each other. The controlling device may cause the valve 15 to switch between the two configurations 1212 and 1214 by actuating the actuator 1210 (e.g., a solenoid switch).

Similarly, the switch valve 13 may switch between the joint check valve configuration 1224 for the PBS 820 and the one-way connection configuration 1222 between the conduit 835 and the conduit 843 for the SBS 821, by actuating the actuator 1220. The one-way connection configuration 1222 may also be achieved by a check valve between the conduit 835 and 843 while separating the conduit 843 from the conduit 823 (and the associated master cylinder 804). As such, the SBS hydraulic pump, accumulator, and motor 810 provides independent and power and pressure failsafe alternative to the PBS 820. In other words, when the PBS 820 experiences power or hardware component failures (e.g., in case of a collision that cuts off power supply or damages the components of the brake pedal 806 for generating required braking pressures), the SBS 821 (with the independent SBS hydraulic pump, accumulator, and motor 810 and motor 812) may continue to provide various braking procedures to ensure the safety of the ADV 101.

Similar to the switch valves 13 and 15 shown in FIG. 12, the switch valves 14 and 16 may perform similar switching operations by switching between two configurations, as shown in FIG. 13, which illustrates example valve combination 1300 of the valves 14 and 16. As shown in FIG. 13, the switch valve 16 operates at two configurations: at the PBS (default) configuration 1314, the switch valve 16 provides a check valve to the conduit 826; at the SBS configuration 1312, the switch valve 16 allows the conduits 826 and 836 to be directly coupled with each other. The controlling device may cause the valve 16 to switch between the two configurations 1312 and 1314 by actuating the actuator 1310 (e.g., a solenoid switch). The switch valve 14 may switch between the joint check valve configuration 1324 for the PBS 820 and the one-way connection configuration 1322 between the conduit 836 and the conduit 844 for the SBS 821, by actuating the actuator 1320. The one-way connection configuration 1322 may also use a check valve between the conduit 836 and 844 while separating the conduit 844 from the conduit 824 (and the associated master cylinder 804).

Although FIGS. 8-13 illustrate that the actuators 892-898 are actuated by two primary pressure conduits 843 and 844, in some cases, one joint conduit (e.g., by combining the conduits 823 and 824 and the corresponding valves, which are performing similar functions) or additional separate conduits (e.g., one pressure conduit for each actuator) may be used, depending on the demands of simplicity and redundancy. For example, a joint conduit, though simple in implementations, is exposed to failure modes that affect multiple actuators sharing the same pressure conduits while using less valves and valve actuators. The tradeoff between simplicity and redundancy depends on specific requirements in specific systems.

Figure 14:
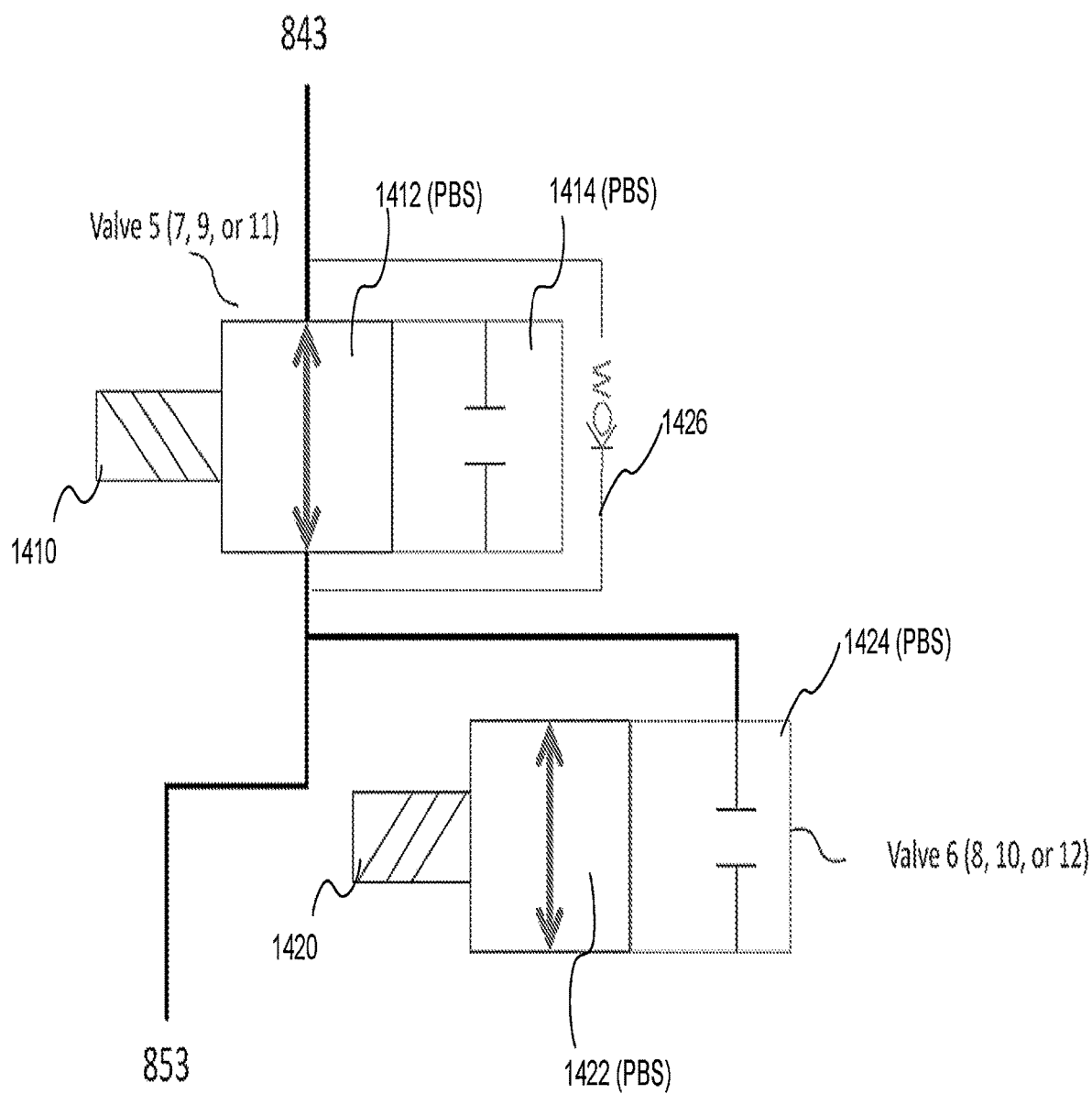

As shown in FIG. 14, the PBS control valves 5, 7, 9, and 11 may be configured in two positions by an actuator 1410 (e.g., a solenoid switch). The PBS control valves 6, 8, 10 and 12 may be, correspondingly, configured in two positions by an actuator 1420. When the braking pressure at the conduit 853 is to be increased, the valve 5 (7, 9, or 11) is set at a default pass-through configuration 1412 (and allows for the brake pedal 806 to increase the output braking pressure of the master cylinder 804). In the meanwhile, the valve 6 (8, 10, or 12) is set at a default separation configuration 1424. The PBS control valve 5 may include a bypass check valve 1426. When the braking pressure at the conduit 853 is to be decreased, the valve 5 (7, 9, or 11) is set at a separation configuration 1414 while the valve 6 (8, 10, or 12) is set at a pass-through configuration 1422 to allow the brake fluids to be released and returned to the reservoir 802.

Figure 15:
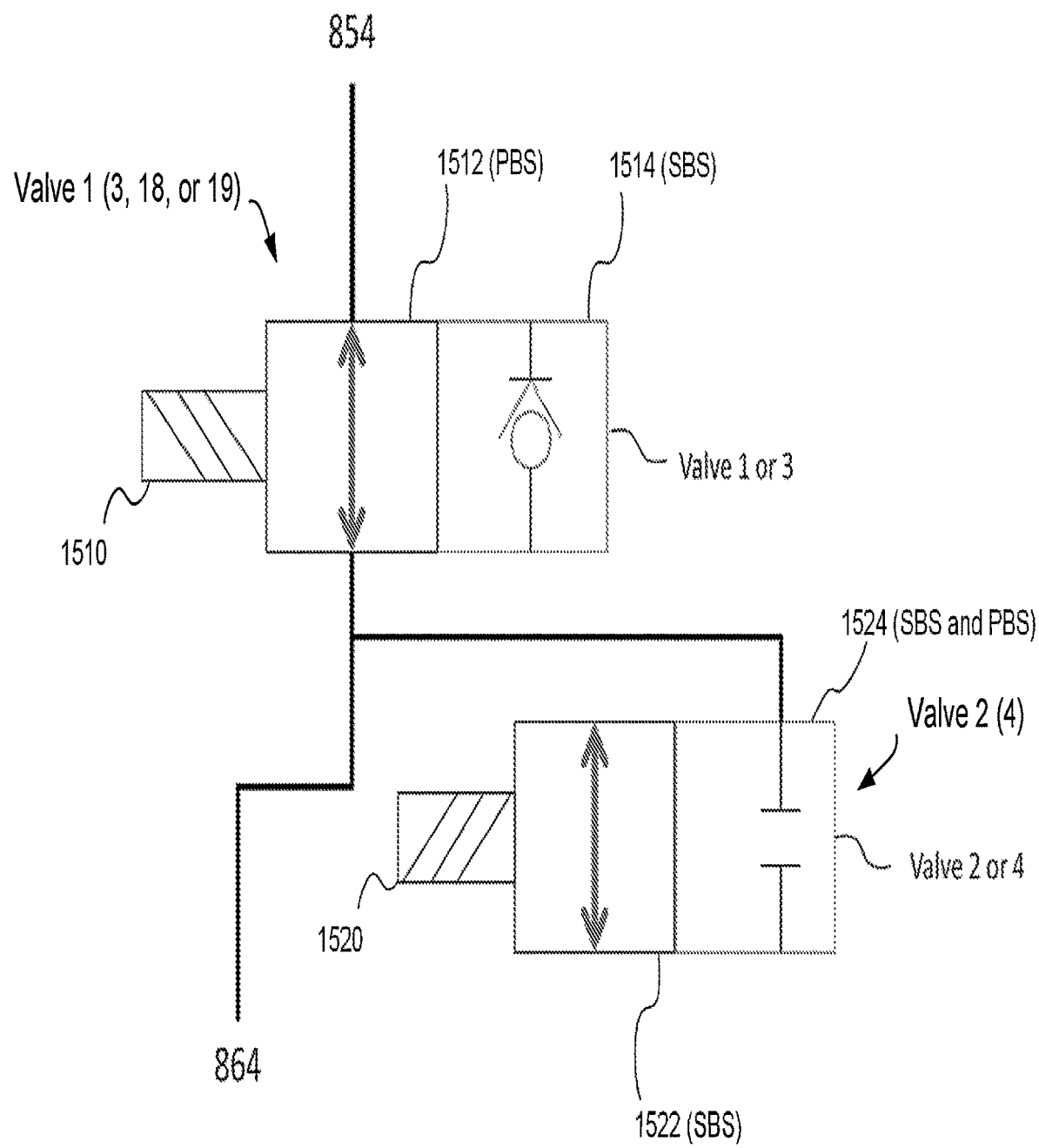

As shown in FIG. 15, the SBS control valves 1, 3, 18, or 19 may be configured in two positions by an actuator 1510 (e.g., a solenoid switch). The SBS control valves 2 or 4 may be, correspondingly, configured in two positions by an actuator 1520. When the SBS 821 is engaged, the valve 1 (3, 18, or 19) is set at a default pass-through configuration 1512 (and allows for the conduit 864 be joined with the conduit 854). In the meanwhile, the valve 2 (or 4) is set at a default separation configuration 1524. When the braking pressure at the conduit 864 is to be decreased, the valve 2 (or 4) is switched from the separation configuration 1524 to the pass-through configuration 1522 to allow the brake fluids to be released and returned to the reservoir 802.

Returning to FIG. 10, during operation of the SBS 821, the braking pressures in the actuators 892 and 898 (for RR and RL wheels) are controlled by the pressure output of the SBS hydraulic pump, accumulator, and motor 810 and the valves 6 and 12 for decreasing the braking pressure and/or returning the brake fluids to the brake fluids reservoir 802. For example, when the controlling device implements AEB, the braking pressure at the conduits 863 and 866 are controlled at the SBS hydraulic pump, accumulator, and motor 810 (e.g., proportional to the power usage at the SBS motor).

The braking pressures in the actuators 894 and 896 (for FL and FR wheels) are controlled by the SBS control valves 1-4. For example, the actuator 894 receives braking pressure at the conduit 864 controlled by the valves 1 and 2 (see FIG. 15). The valve 1 may switch between a pass-through configuration 1512 for PBS operations and a one-way configuration 1514 for SBS operations. When the SBS 821 is engaged, the valve 1 prevents backflow to the conduit 854 and/or sets a minimum actuation braking pressure. Like the conduit 863, the conduit 864 responds to brake pressure increase at the SBS hydraulic pump, accumulator, and motor 810. Unlike the conduit 863, the conduit 864 has a dedicated pressure release valve 2 for releasing the braking pressure at the actuator 894 and returning the brake fluids to the reservoir 802. In some cases, the SBS 821 may use valve 8 to achieve the same pressure release operations by the valve 2 (e.g., not including the valve 2 and associated complexity and costs in the SBS 821). The actuator 896 receives similar braking pressure regulation as in the actuator 894 by controlling the valves 3 and 4.

Figure 11:
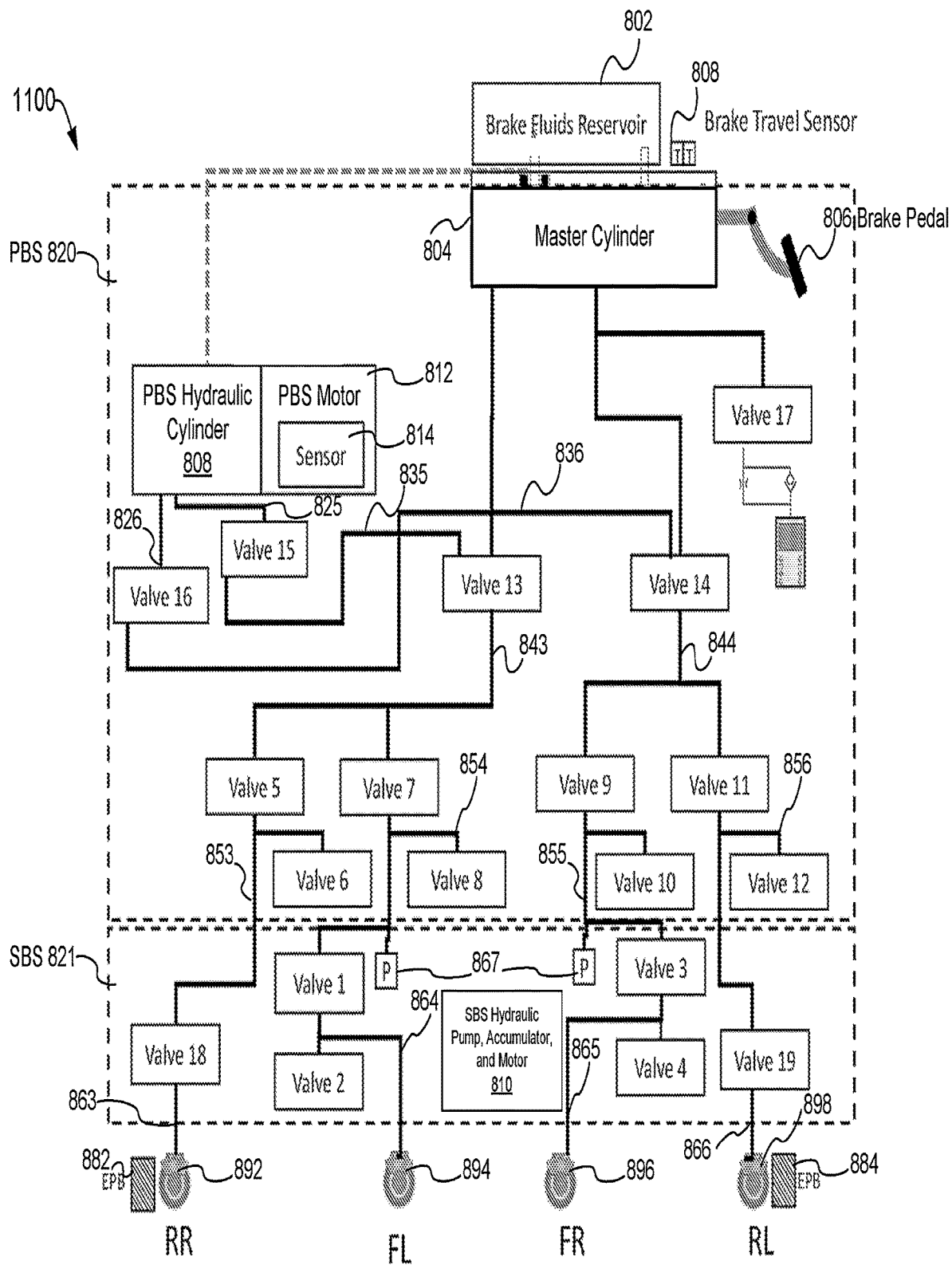
FIG. 11 illustrates an example schematics of a braking unit including a PBS and an SBS, in accordance with aspects of the present disclosure.

In some cases, the actuators 892 and 898 may respectively include one more valve for braking pressure control, as shown in FIG. 11. FIG. 11 illustrates an example schematics of a braking unit 1100 including the PBS 820 and the SBS 821, in accordance with aspects of the present disclosure. Compared to the braking unit 800, the braking unit 1100 further includes SBS control valves 18 and 19 (e.g., optional) for respectively controlling the actuators 892 and 898 (for RR and RL wheels). When the SBS 821 is engaged, the valves 18 and 19 may, by switching to a check-valve configuration from a pass-through configuration, prevent backflow to the respective conduits 853 and 856 and/or sets a respective minimum actuation braking pressure.

The controlling device may, in addition to individually controlling the valves 1-4 and 18-19 when the SBS 821 is engaged, actuate electronic parking brakes (EPB) 882 and 884 for long-term standstill assistance. In some cases, the master cylinder 804 may be monitored, calibrated, or adjusted by the controlling device via the valve 17 (similar to valve 2 or 4 in FIG. 15). The operation of the PBS 820 and SBS 821 may be monitored by one or more pressure sensors in the conduits, such as the pressure sensors 867 at the conduits 854 and 855.

Therefore, as shown in FIGS. 8-15, by individually controlling each of the actuators 892-898 via the valves 1-17 (with 18-19 optional), the ADV 101 may use two independent braking sub-systems to ensure each braking procedure can be performed by a redundant and independent system. This way, potential failures in the power source, motor input, or valves of the PBS 820 does not impact or affect the performance of the SBS 821.

Figure 16:
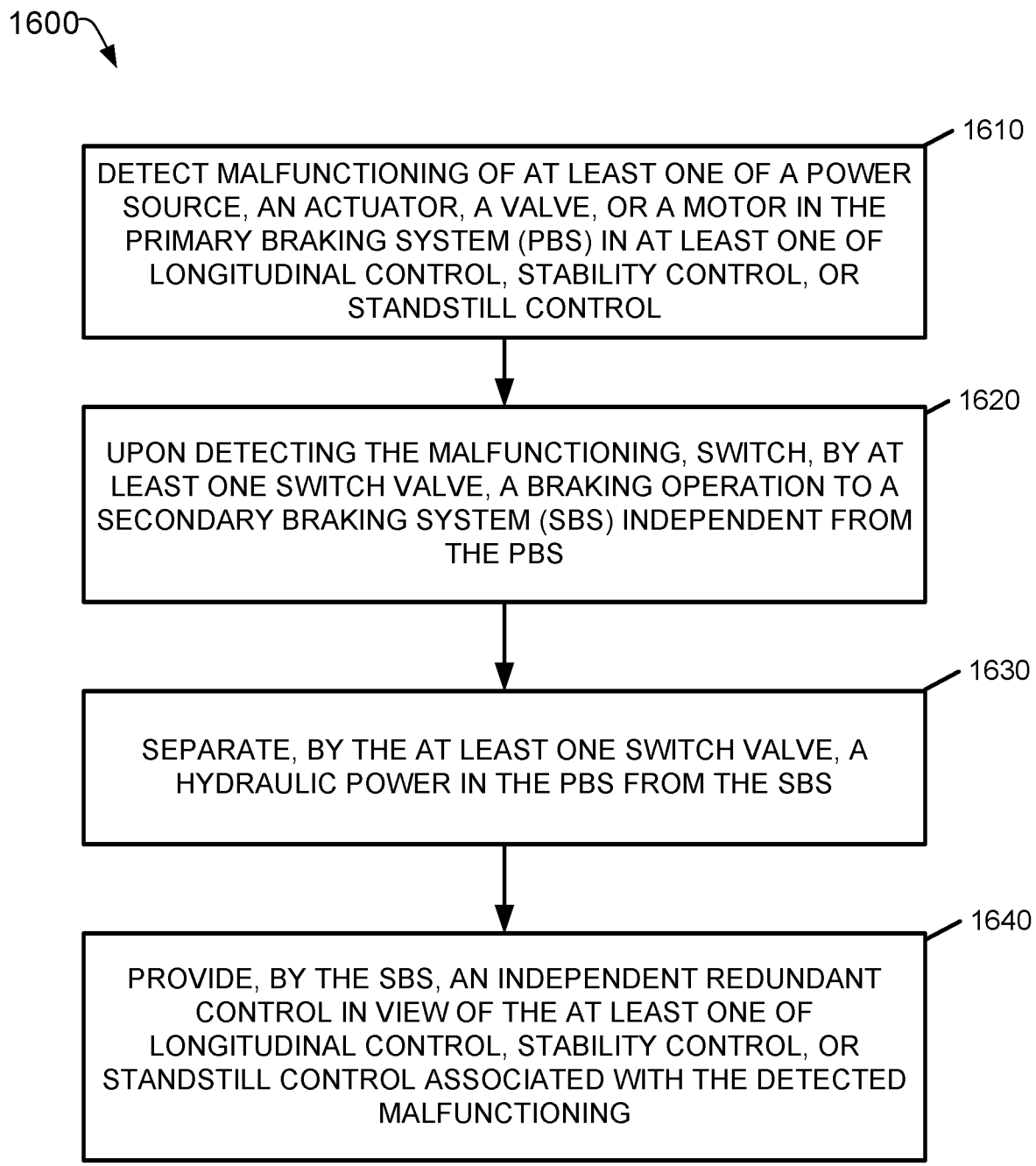
FIG. 16 a flow diagram illustrating a method of implementing an SBS, in accordance with aspects of the present disclosure.

FIG. 16 a flow diagram 1600 illustrating a method of implementing an SBS, in accordance with aspects of the present disclosure. The method may be applicable to electric, hybrid, or internal combustion engine powered ADVs. The method may be performed by a processing logic (e.g., the controlling device 518 of FIG. 5), which may include software, hardware, or a combination thereof.

At operation 1610, the control module detects malfunctioning of at least one of a power source, an actuator, a valve, or a motor in the primary braking system (PBS, such as the PBS 820 of FIG. 8) in at least one of longitudinal control, stability control, or standstill control.

At operation 1620, the control module switches, upon detecting the malfunctioning and by at least one switch valve, a braking operation to a secondary braking system (SBS, such as the SBS 821 of FIG. 8) independent from the PBS.

At operation 1630, the control module separates, by the at least one switch valve, a hydraulic power in the PBS from the SBS.

At operation 1640, the control module provides, by the SBS, an independent redundant control in view of the at least one of longitudinal control, stability control, or standstill control associated with the detected malfunctioning.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A braking system for a computer assisted driving vehicle, the braking system comprising:
   a first braking sub-system powered by a first power source, the first braking sub-system comprising:
      a first electric motor to generate a first pressure providing hydraulic power to two or more sets of braking actuators,
      a first plurality of valves receiving the hydraulic power and operable to vary respective actuating braking pressures at the two or more sets of braking actuators, and
      a controlling device to operate the first plurality of valves for varying the respective actuating braking pressures, wherein the controlling device controls the two or more sets of braking actuators to independently perform primary braking procedures; and
   at least one switch valve to switch the first braking sub-system to a second braking sub-system upon detecting that at least one of the primary braking procedures is malfunctioning.

2. The braking system of claim 1, wherein the second braking sub-system is independent from the first power source and comprises:
   a second electric motor, independent from the first electric motor, to generate a second pressure providing the hydraulic power, by switching the at least one switch valve, to the two or more sets of braking actuators; and
   a second plurality of valves controlled by the controlling device operable to independently provide backup braking procedures at the two or more sets of braking actuators, wherein the backup braking procedures correspond to the malfunctioning at least one of the primary braking procedures.

3. The braking system of claim 2, wherein the controlling device comprises:
   a processor; and
   a memory coupled to the processor to store instructions, which when executed by the processor, cause the processor to:
      receive data of obstacle conditions and road conditions;
      disengage a power supply to one or more motors of the computer assisted driving vehicle based on the data of obstacle conditions and road conditions, wherein the one or more motors comprise at least one electric motor or an internal combustion engine;
      engage the first braking sub-system of the braking system to perform the primary braking procedures by default; and
      engage the second braking sub-system upon detecting, by the controlling device, that at least one of the primary braking procedures is malfunctioning.

4. The braking system of claim 3, wherein the first plurality valves and the second plurality of valves respectively and independently controls each of the two or more braking actuators that respectively provides braking forces on each wheel of the computer assisted driving vehicle.

5. The braking system of claim 4, wherein the processor and the memory of the controlling device are further to:
   receive sensor data of rotation of each wheel of the computer assisted driving vehicle; and
   individually control, via the second plurality of valves, when the second braking sub-system is engaged.

6. The braking system of claim 5, wherein each of the two or more braking actuators is configured to:
   increase, in a secondary longitudinal control, the second pressure when an emergency condition has been detected; or
   increase, in the secondary longitudinal control, the second pressure to slow down the computer assisted driving vehicle when a speed difference between the computer assisted driving vehicle and one or more surrounding vehicles exceeds a threshold value.

7. The braking system of claim 6, wherein each of the two or more braking actuators is further configured to:
   reduce, in a secondary stability control, a braking pressure on at least one wheel when the at least one wheel rotates slower than other wheels to indicate locking;
   increase, in the secondary stability control, a braking pressure on at least one wheel when a difference between a desired steering direction and a measured steering direction exceeds a threshold value; or
   engage, in a secondary standstill control, a parking brake when an unintended wheel rotation has been detected, wherein the parking brake applies a braking force for holding the computer assisted driving vehicle still.

8. The braking system of claim 1, wherein the at least one switch valve comprises:
   a first actuation valve operable to separate the second braking sub-system from the first braking sub-system that comprises a master cylinder, when the second braking sub-system is engaged upon detecting, by the controlling device, that at least one of the primary braking procedures is malfunctioning, wherein the first actuation valve prevents the first pressure to apply to the second braking sub-system by switching from a primary position to a secondary position, wherein:
      in the primary position, the first actuation valve provides hydraulic fluids from a master cylinder and a booster cylinder to the first plurality of valves; and
      in the secondary position, the first actuation valve shuts off hydraulic fluids from the master cylinder.

9. The braking system of claim 8, wherein the at least one switch valve further comprises:
   a second actuation valve operable to switch between a free-flow position and a check valve position, wherein the free-flow position is used during engagement of the second braking sub-system for receiving hydraulic fluids from the booster cylinder.

10. The braking system of claim 2, wherein the two or more sets of braking actuators comprises:
    a front-left braking actuator operable to apply a braking force on a front-left wheel of the computer assisted driving vehicle;
    a front-right braking actuator operable to apply a braking force on a front-right wheel of the computer assisted driving vehicle;
    a rear-left braking actuator operable to apply a braking force on a rear-left wheel of the computer assisted driving vehicle; and
    a rear-right braking actuator operable to apply a braking force on a rear-right wheel of the computer assisted driving vehicle; and wherein the first plurality of valves and the second plurality of valves are respectively operable to independently vary corresponding braking forces on the front-left, front-right, rear-left, and rear-right wheels, wherein the rear-left braking actuator and the rear-right braking actuator further comprise an electronic parking brake respectively or jointly.

11. A method for providing backup braking to an autonomous driving vehicle (ADV), the method comprising:
powering a first braking sub-system with a first power source;
generating a first pressure with a first electric motor to provide hydraulic power to two or more sets of braking actuators;
transferring the hydraulic power to a first plurality of valves to vary respective actuating braking pressures at the two or more sets of braking actuators, wherein the first plurality of valves comprising at least one switch valve;
operating, by a controlling device, the first plurality of valves for varying the respective actuating braking pressures, wherein the controlling device controls the two or more sets of braking actuators to independently perform primary braking procedures; and
upon detecting that at least one of the primary braking procedures is malfunctioning, switching, by at least one switch valve, a braking operation to a second braking sub-system independent from the first power source.

12. The method of claim 11, further comprising:
generating, by a second electric motor independent from the first electric motor, a second pressure providing the hydraulic power, by switching the at least one switch valve, to the two or more sets of braking actuators; and
independently providing, via a second plurality of valves controlled by the controlling device, backup braking procedures at the two or more sets of braking actuators, wherein the backup braking procedures correspond to the malfunctioning at least one of the primary braking procedures.

13. The method of claim 12, further comprising:
receiving, at the controlling device, data of obstacle conditions and road conditions;
disengaging a power supply to one or more motors of the ADV based on the data of obstacle conditions and road conditions, wherein the one or more motors comprise at least one electric motor or an internal combustion engine;
engaging the first braking sub-system of the braking system to perform the primary braking procedures by default; and
engaging the second braking sub-system upon detecting, by the controlling device, that at least one of the primary braking procedures is malfunctioning.

14. The method of claim 13, further comprising: respectively and independently controlling, by the first plurality of valves and the second plurality of valves, each of the two or more braking actuators that respectively provides braking forces on each wheel of the ADV.

15. The method of claim 14, further comprising:
receiving sensor data of rotation of each wheel of the ADV; and
individually controlling, via the second plurality of valves, when the second braking sub-system is engaged, each of the two or more braking actuators to:
increase, in a secondary longitudinal control, the second pressure when an emergency condition has been detected;
increase, in the secondary longitudinal control, the second pressure to slow down the ADV when a speed difference between the ADV and one or more surrounding vehicles exceeds a threshold value;
reduce, in a secondary stability control, a braking pressure on at least one wheel when the at least one wheel rotates slower than other wheels to indicate locking;
increase, in the secondary stability control, a braking pressure on at least one wheel when a difference between a desired steering direction and a measured steering direction exceeds a threshold value; or
engage, in a secondary standstill control, a parking brake when an unintended wheel rotation has been detected, wherein the parking brake applies a braking force for holding the ADV still.

16. The method of claim 11, wherein switching, by the at least one switch valve, the braking operation to the second braking sub-system comprises:
separating, by a first actuation valve, the second braking sub-system from the first braking sub-system that comprises a master cylinder, when the second braking sub-system is engaged upon detecting, by the controlling device, that at least one of the primary braking procedures is malfunctioning, wherein the first actuation valve prevents the first pressure to apply to the second braking sub-system by switching from a primary position to a secondary position, wherein:
in the primary position, the first actuation valve provides hydraulic fluids from a master cylinder and a booster cylinder to the first plurality of valves; and
in the secondary position, the first actuation valve shuts off hydraulic fluids from the master cylinder.

17. The method of claim 16, wherein switching the braking operation to the second braking sub-system further comprises:
switching, at a second actuation valve from a check valve position to a free-flow position, wherein the free-flow position is used during engagement of the second braking sub-system for receiving hydraulic fluids from the booster cylinder.

18. The method of claim 11, wherein the two or more sets of braking actuators comprises:
a front-left braking actuator operable to apply a braking force on a front-left wheel of the ADV;
a front-right braking actuator operable to apply a braking force on a front-right wheel of the ADV;
a rear-left braking actuator operable to apply a braking force on a rear-left wheel of the ADV; and
a rear-right braking actuator operable to apply a braking force on a rear-right wheel of the ADV; and wherein the first plurality of valves and the second plurality of valves are respectively operable to independently vary corresponding braking forces on the front-left, front-right, rear-left, and rear-right wheels; and
wherein the rear-left braking actuator and the rear-right braking actuator further comprise an electronic parking brake respectively or jointly.

19. A non-transitory machine-readable medium having instructions stored therein for providing backup braking to an autonomous driving vehicle (ADV), which when executed by a processor, cause the processor to perform operations, the operations comprising:
powering a first braking sub-system with a first power source;
generating a first pressure with a first electric motor to provide hydraulic power to two or more sets of braking actuators;
transferring the hydraulic power to a first plurality of valves to vary respective actuating braking pressures at the two or more sets of braking actuators, wherein the first plurality of valves comprising at least one switch valve;

operating, by the processor, the first plurality of valves for varying the respective actuating braking pressures, wherein the processor controls the two or more sets of braking actuators to independently perform primary braking procedures; and upon detecting that at least one of the primary braking procedures is malfunctioning, switching, by at least one switch valve, a braking operation to a second braking sub-system independent from the first power source.

20. The non-transitory machine-readable medium of claim 19, wherein the operations further comprise:

generating, by a second electric motor independent from the first electric motor, a second pressure providing the hydraulic power, by switching the at least one switch valve, to the two or more sets of braking actuators; and independently providing, via a second plurality of valves controlled by the processor, backup braking procedures at the two or more sets of braking actuators, wherein the backup braking procedures correspond to the malfunctioning at least one of the primary braking procedures.

* * * * *